United States Patent [19]
Yoon

[11] Patent Number: 5,566,026
[45] Date of Patent: Oct. 15, 1996

[54] ZOOM LENS

[75] Inventor: Yong-kyu Yoon, Changwon-si, Rep. of Korea

[73] Assignee: Samsung Aerospace Industries, Ltd., Kyeongsangnam-do, Rep. of Korea

[21] Appl. No.: 81,159

[22] Filed: Jun. 25, 1993

[51] Int. Cl.⁶ ................................................. G02B 15/14
[52] U.S. Cl. ................................................. 359/689
[58] Field of Search ................................. 359/689, 686

[56]       References Cited

U.S. PATENT DOCUMENTS

| | | | |
|---|---|---|---|
| 4,398,808 | 8/1983 | Fujibayashi | 359/686 |
| 4,978,204 | 12/1990 | Ito | 359/689 |
| 4,983,027 | 1/1991 | Kojima et al. | 359/689 |
| 5,002,373 | 3/1991 | Yamanashi | 359/684 |
| 5,033,832 | 7/1991 | Ito | 359/689 |
| 5,159,494 | 10/1992 | Yamanashi | 359/689 |
| 5,424,871 | 6/1995 | Ito et al. | 359/689 |

*Primary Examiner*—Georgia Y. Epps
*Assistant Examiner*—Jordan M. Schwartz
*Attorney, Agent, or Firm*—Finnegan, Henderson, Farabow, Garrett & Dunner, L.L.P.

[57]            ABSTRACT

A compact zoom lens system having a zoom ratio of an approximately 3.5 times comprising a first lens group having a positive refractive power, a second lens group having a positive refractive power and spaced from said first lens group at a first distance, and a third lens group having a negative refractive power and spaced from the second lens group at a second distance, the first and second distances being variable during zooming, wherein $3.0 < f_T/f_W$, and $L_T/f_T < 1.0$ where $f_T$ is the focal length of the zoom lens system at a telephoto position, $f_W$ is the focal length of the zoom lens system at a wide angle position, and $L_T$ is the distance from the first surface of the zoom lens system to the image plane at a telephoto position.

29 Claims, 18 Drawing Sheets

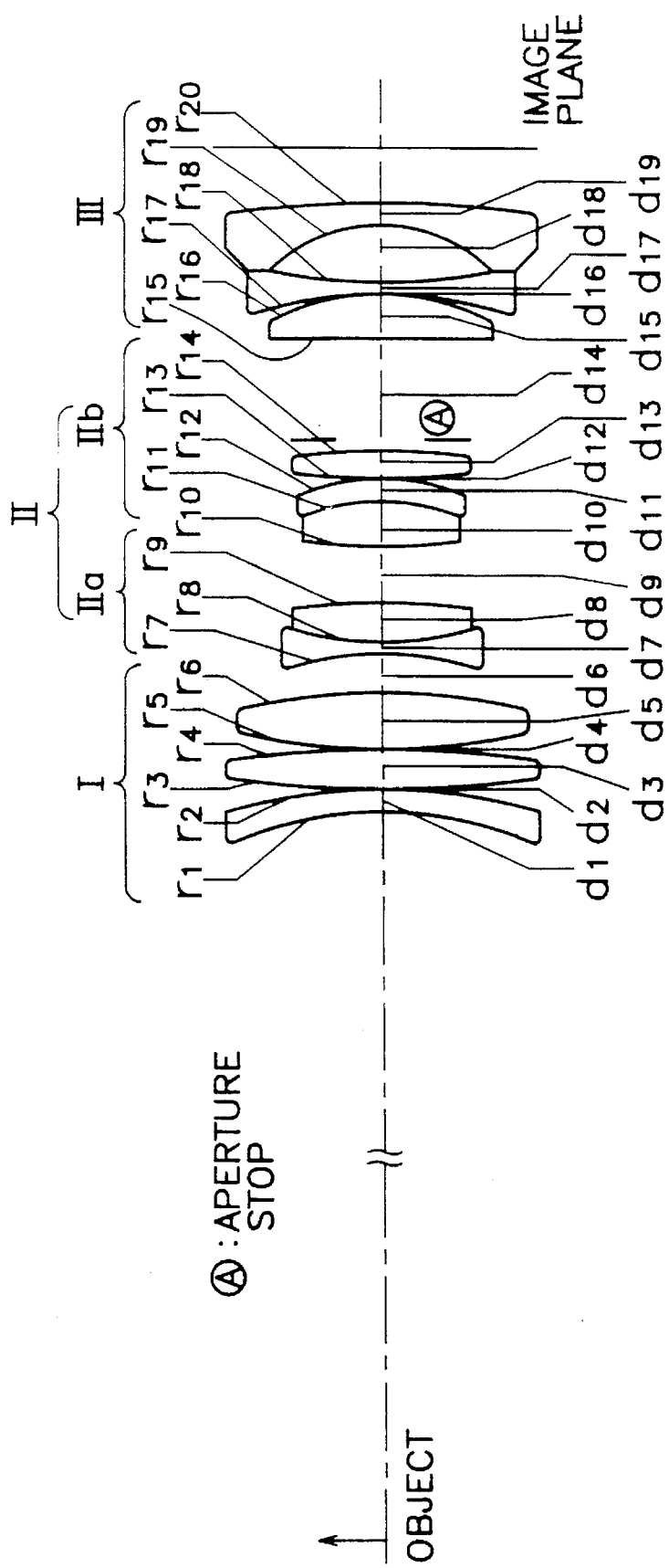

MIDDLE POSITION

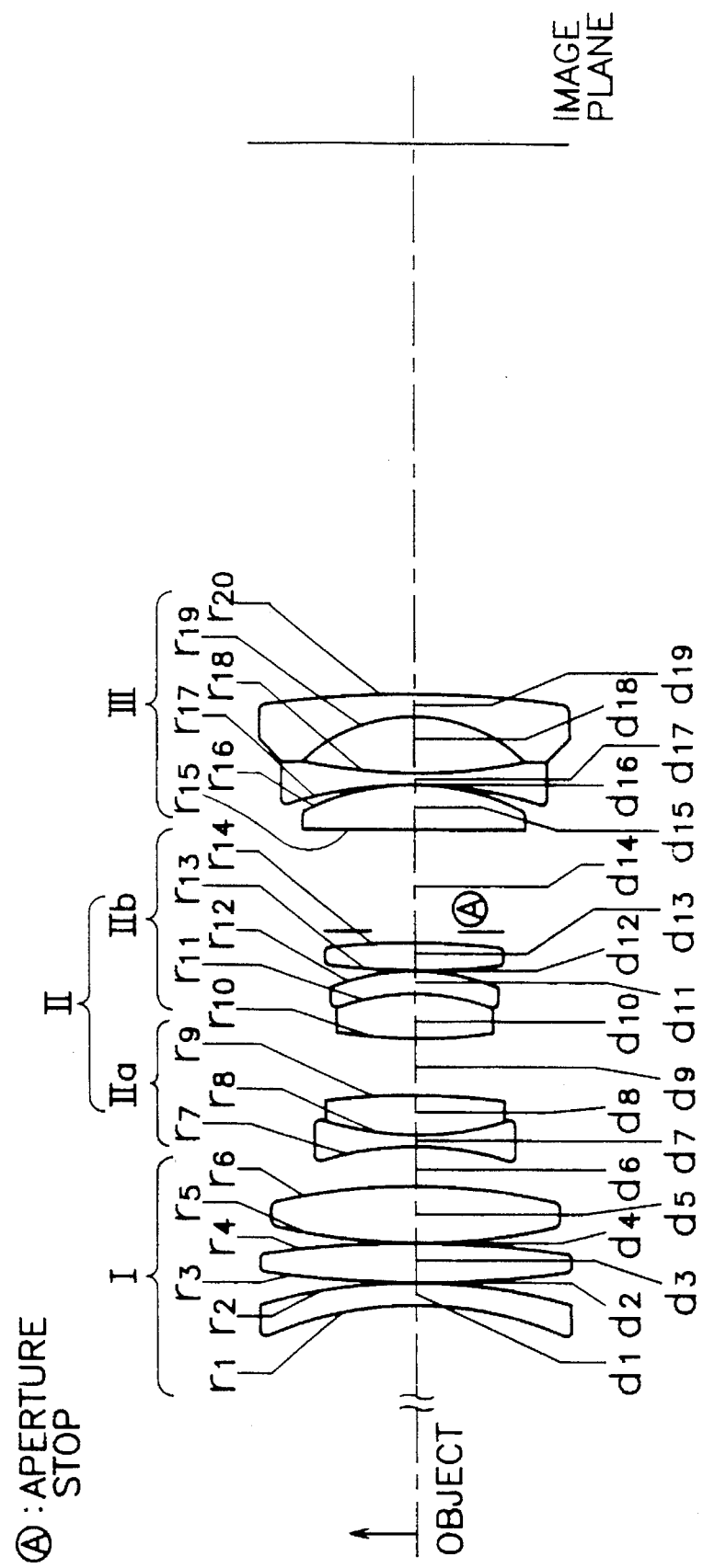
FIG.1C  TELEPHOTO POSITION

FIG.2B
MIDDLE POSITION
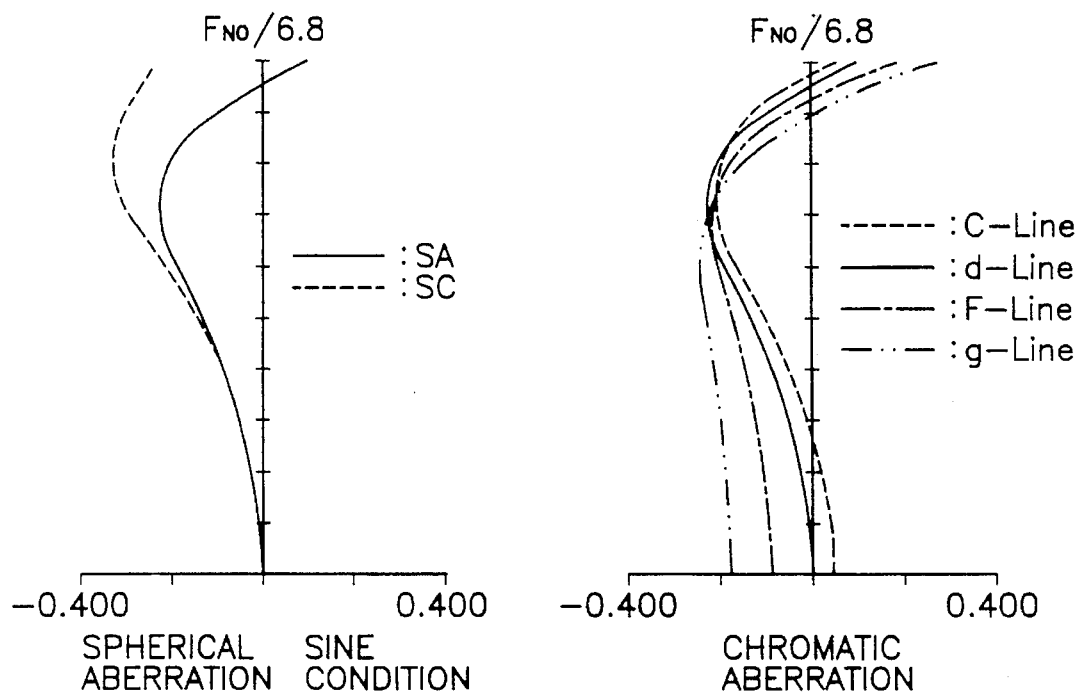
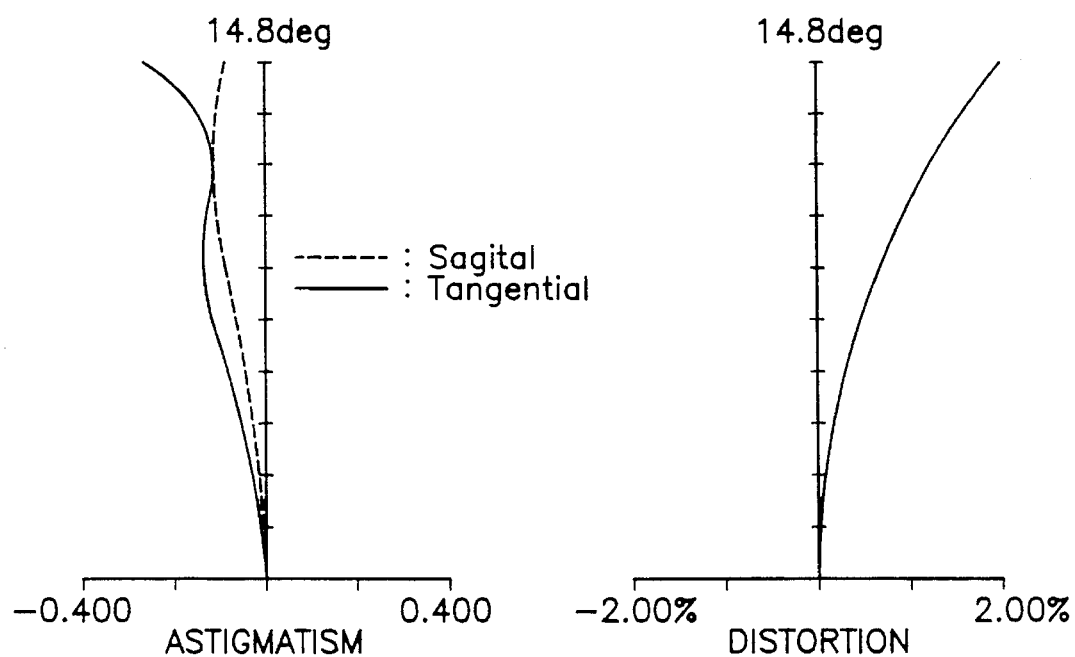

FIG.2C
TELEPHOTO POSITION
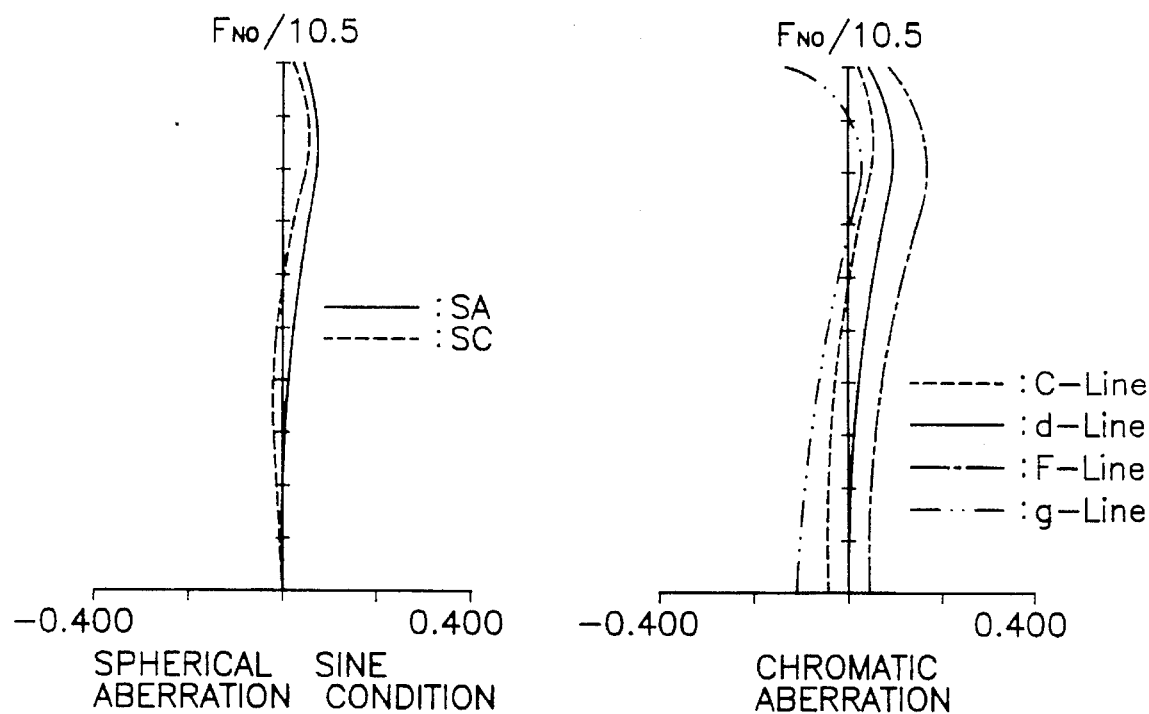
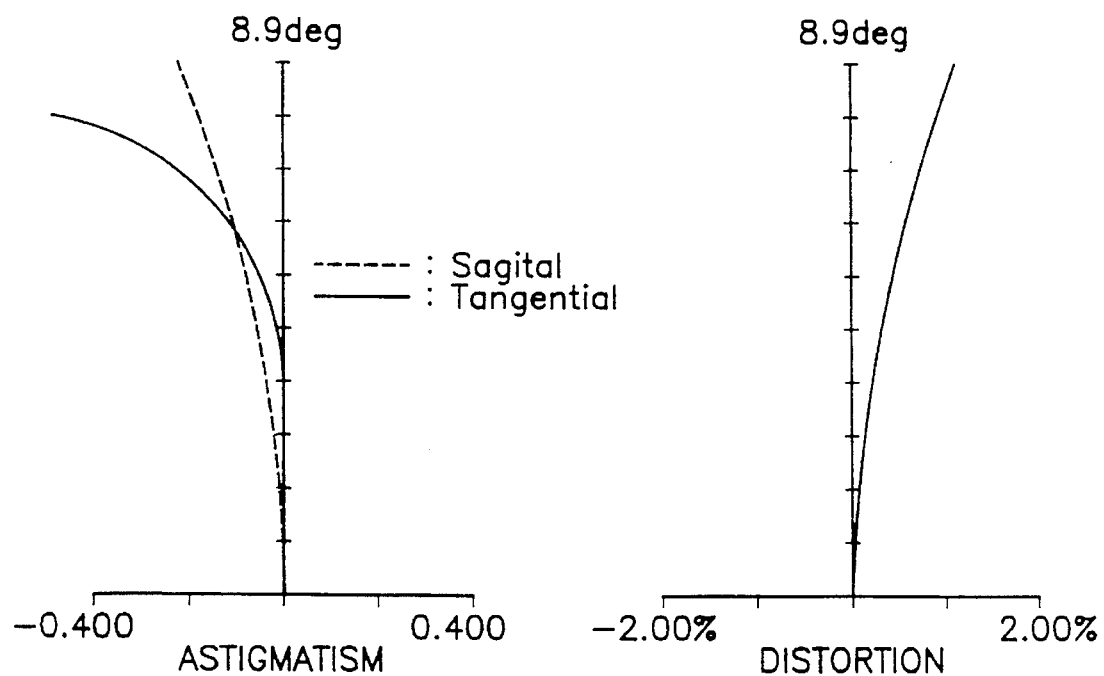

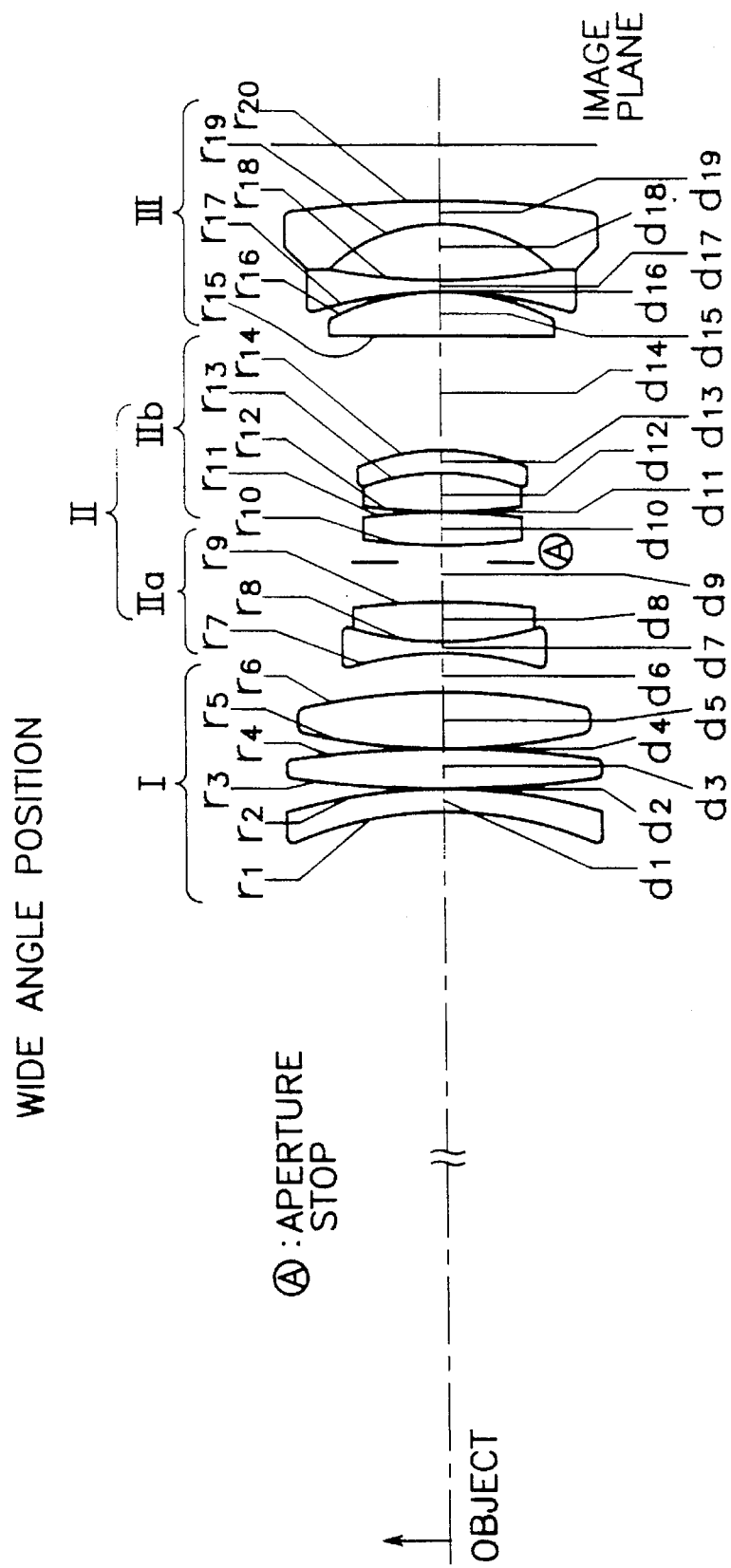
FIG.3A WIDE ANGLE POSITION

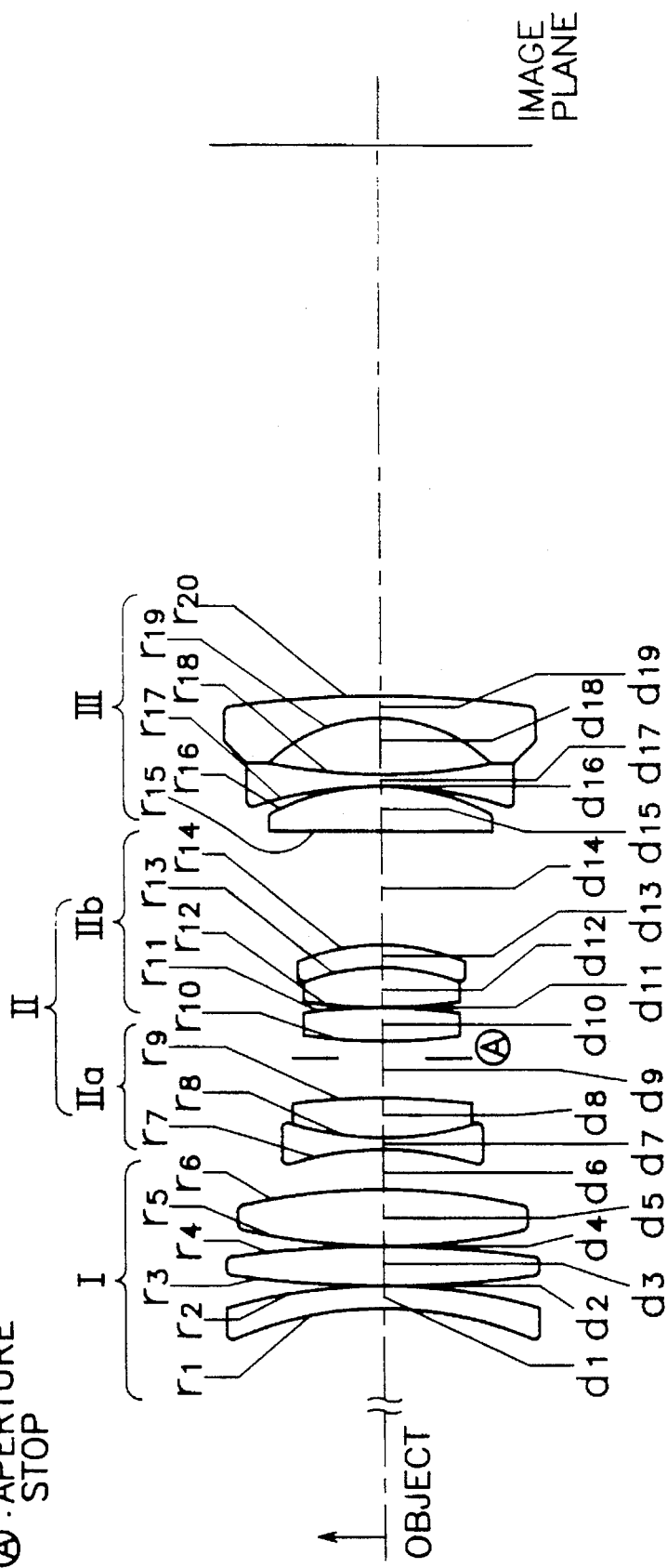

FIG.4A
WIDE ANGLE POSITION
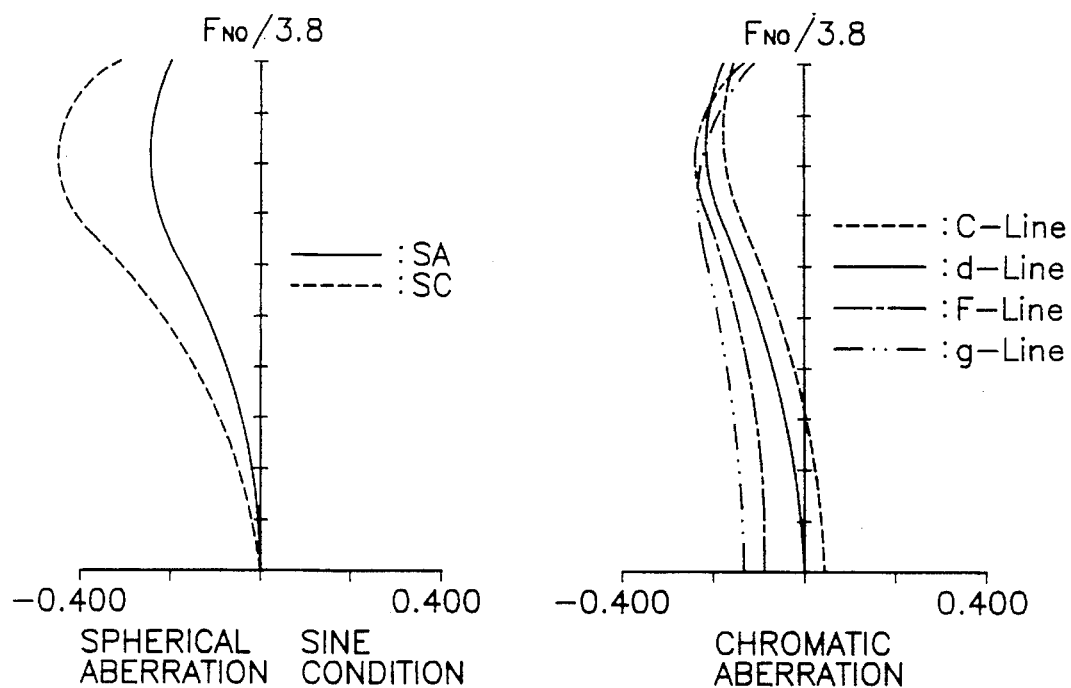
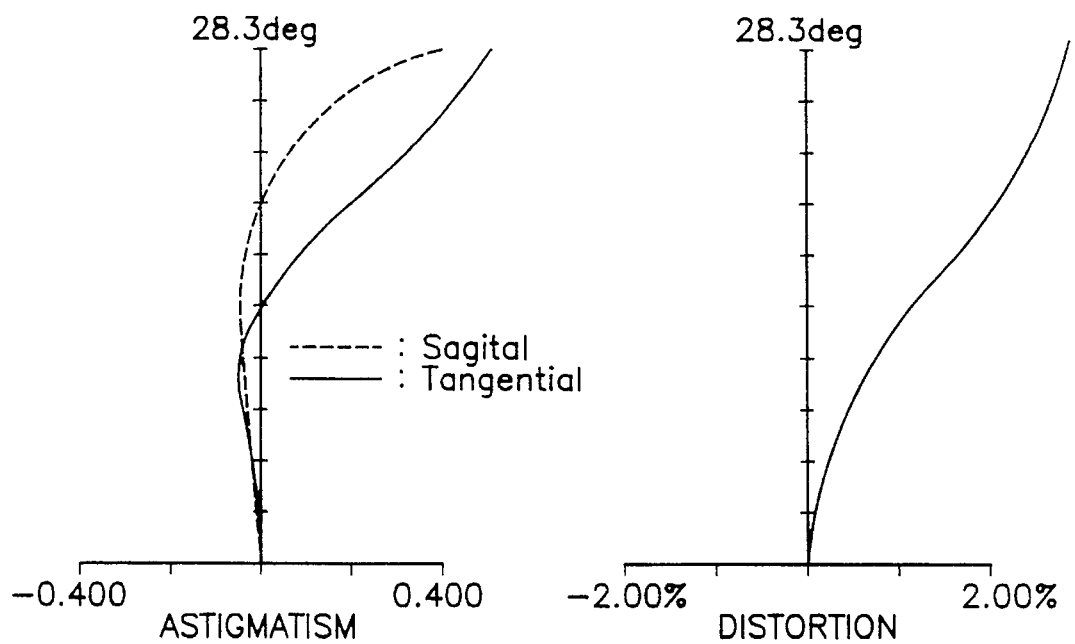

FIG.4B
MIDDLE POSITION
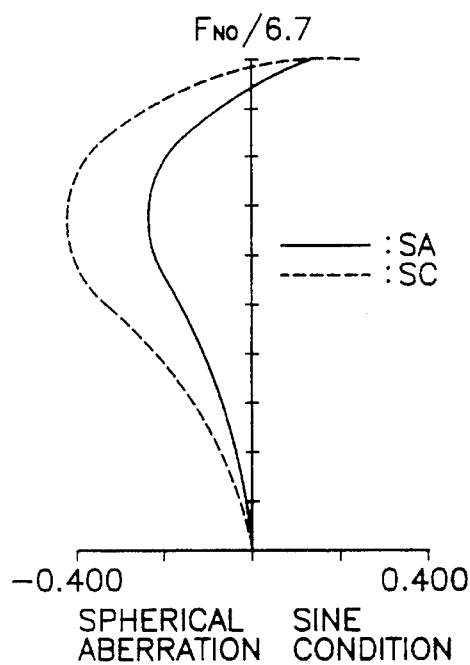
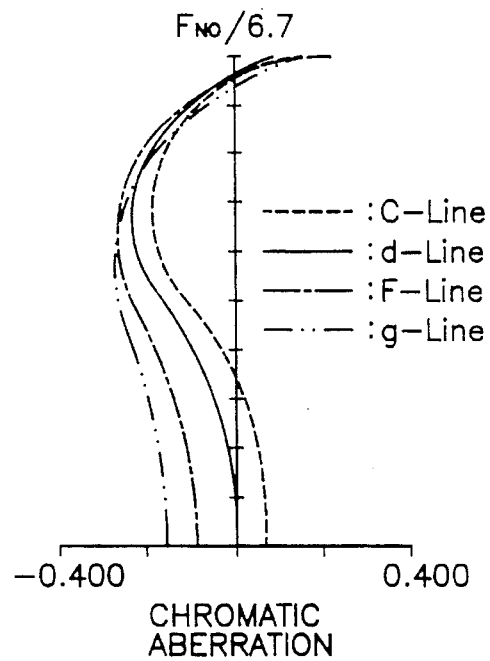
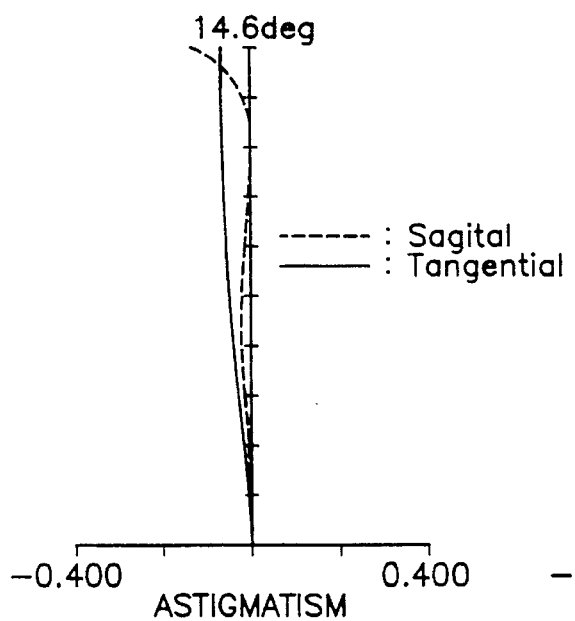
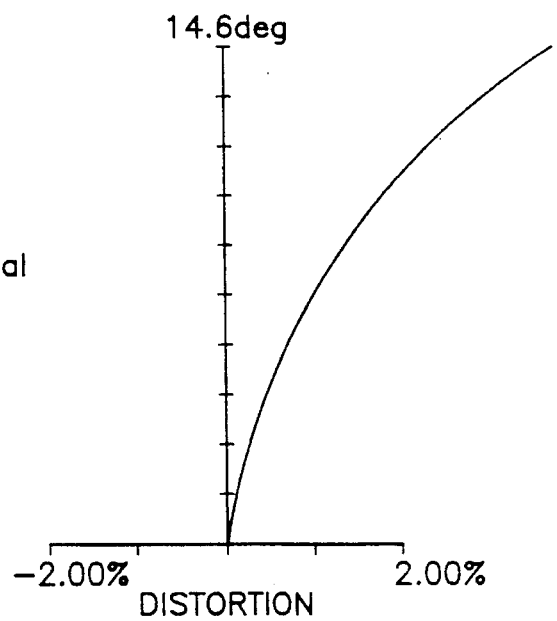

FIG.4C
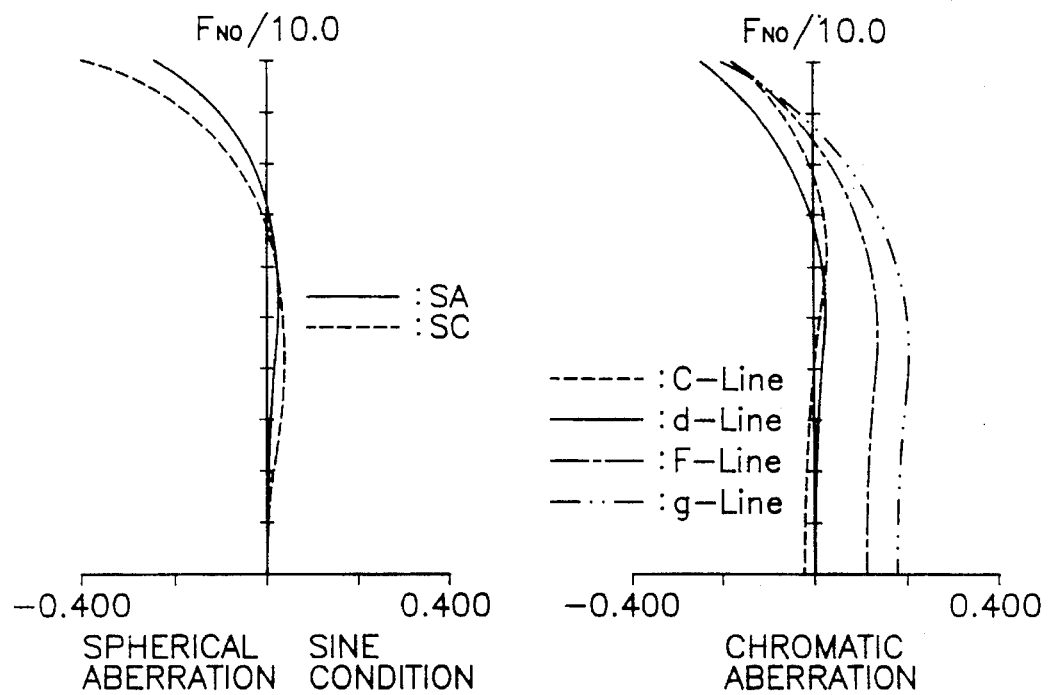
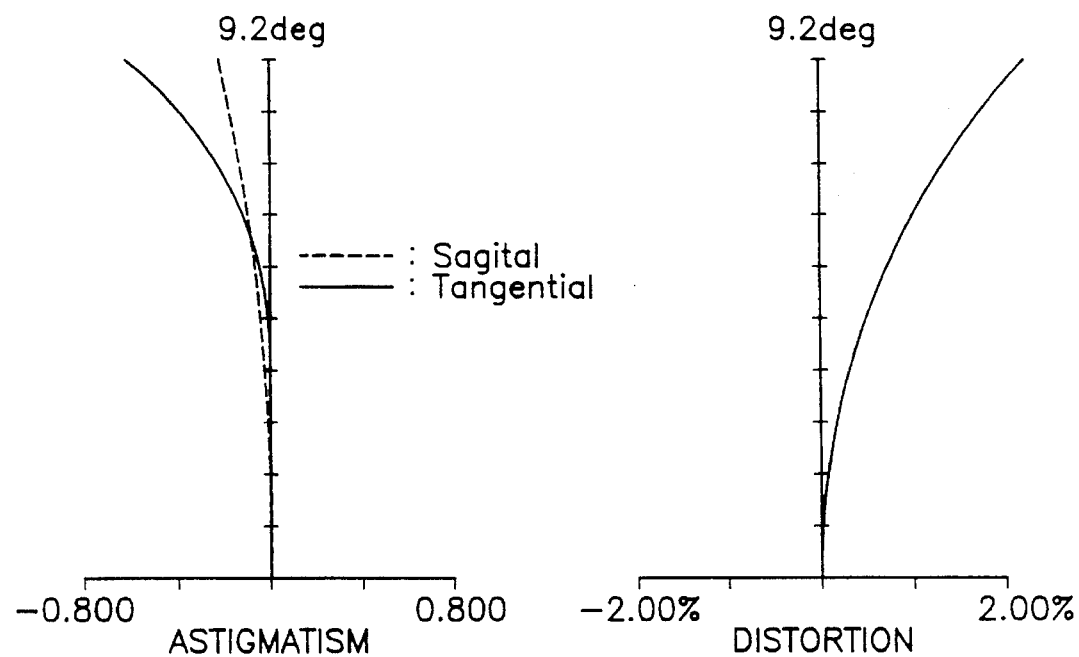

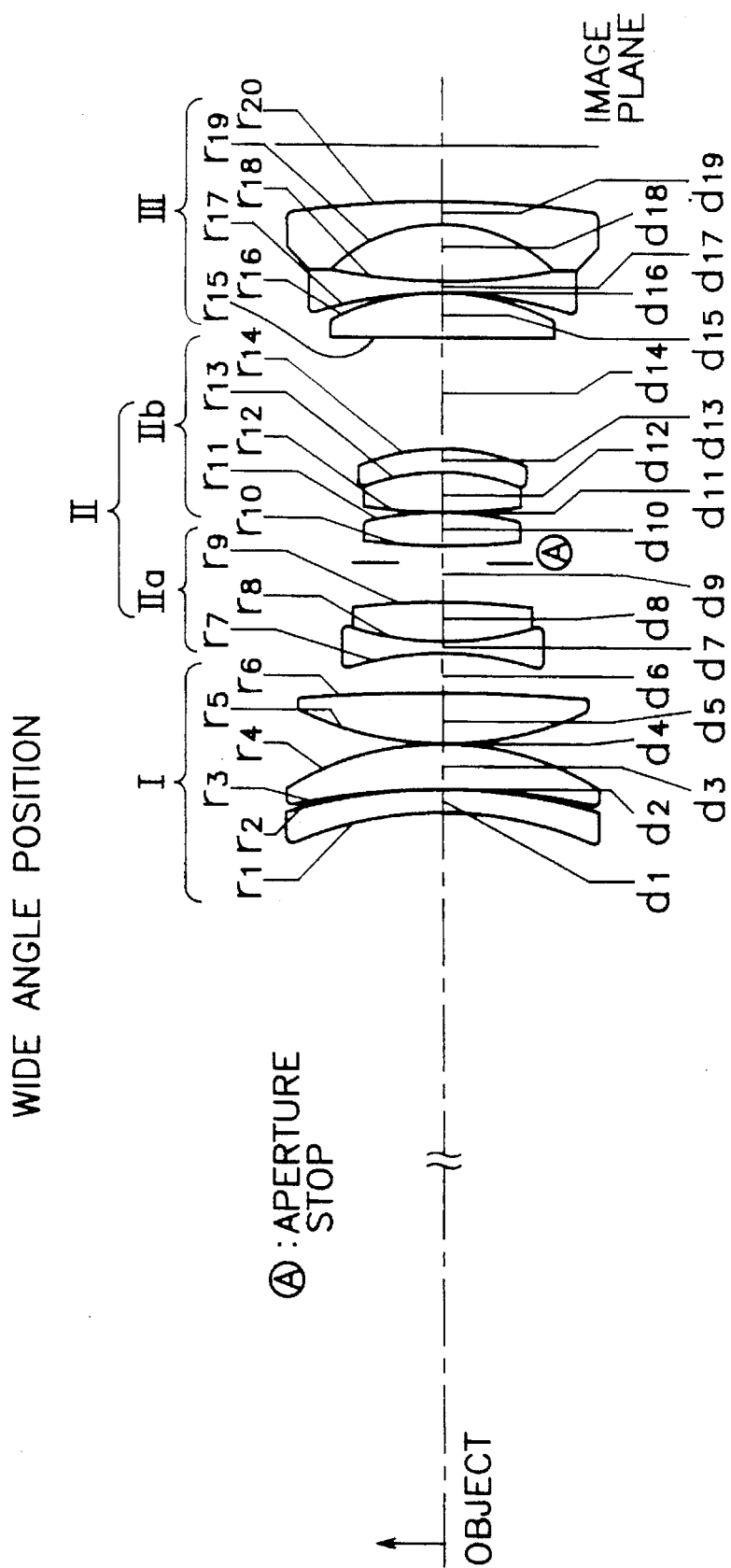

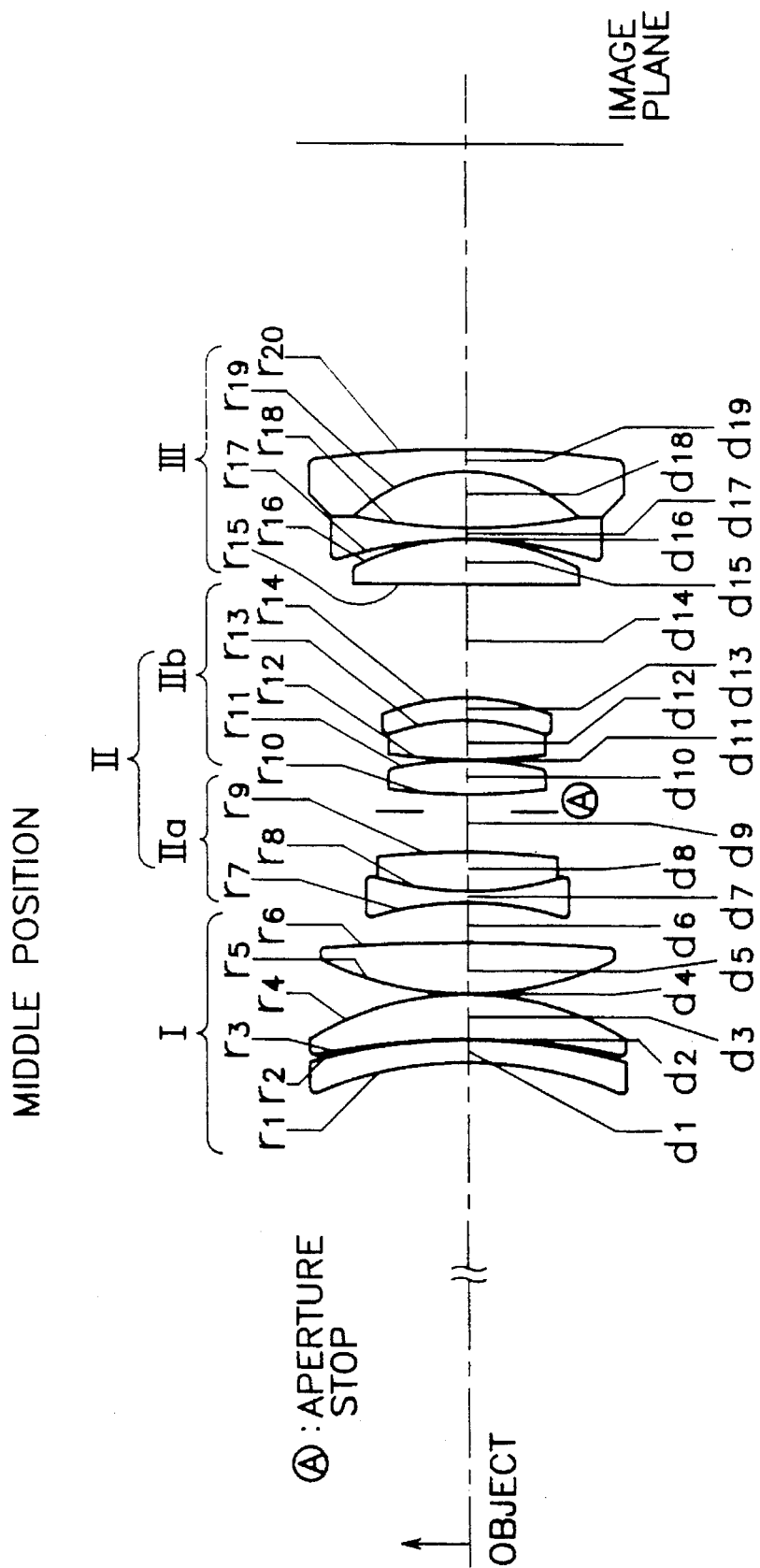
FIG.5B  MIDDLE POSITION

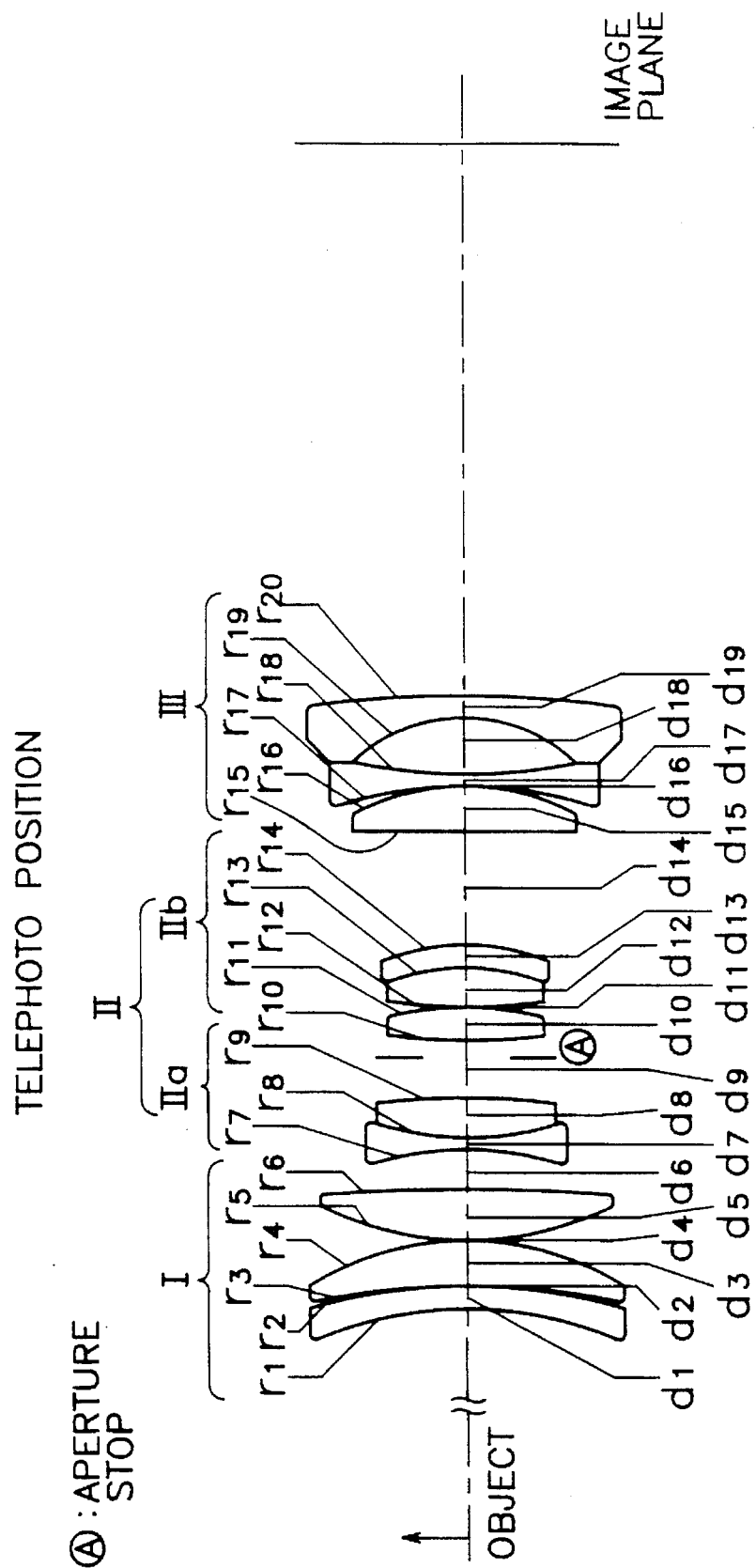
FIG.5C TELEPHOTO POSITION

FIG.6A
WIDE ANGLE POSITION
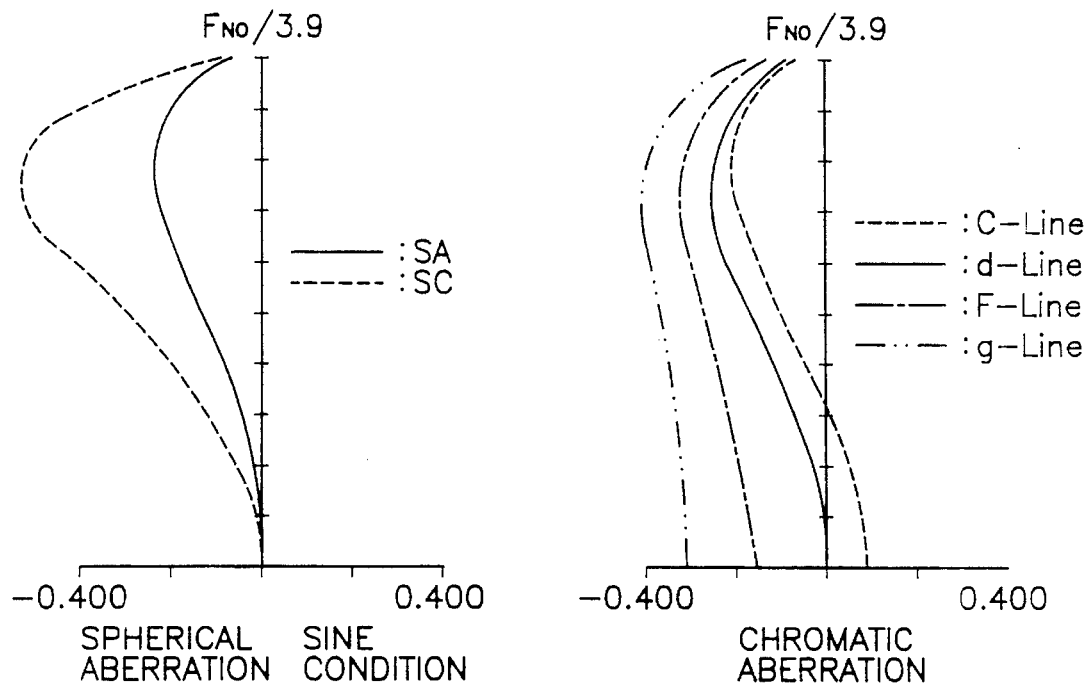
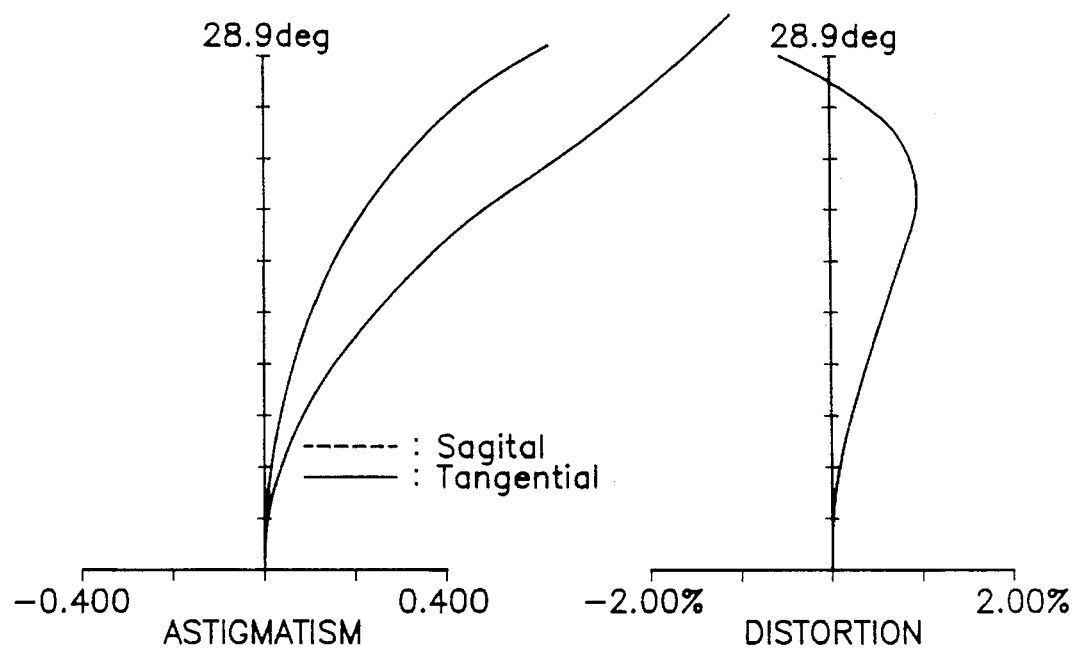

FIG.6B
MIDDLE POSITION
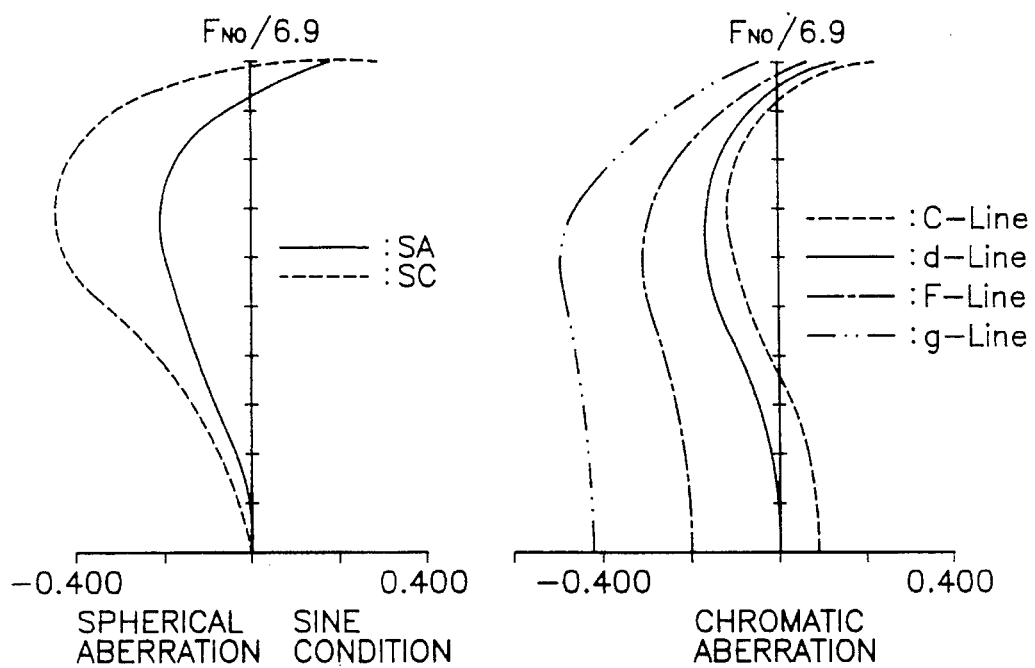
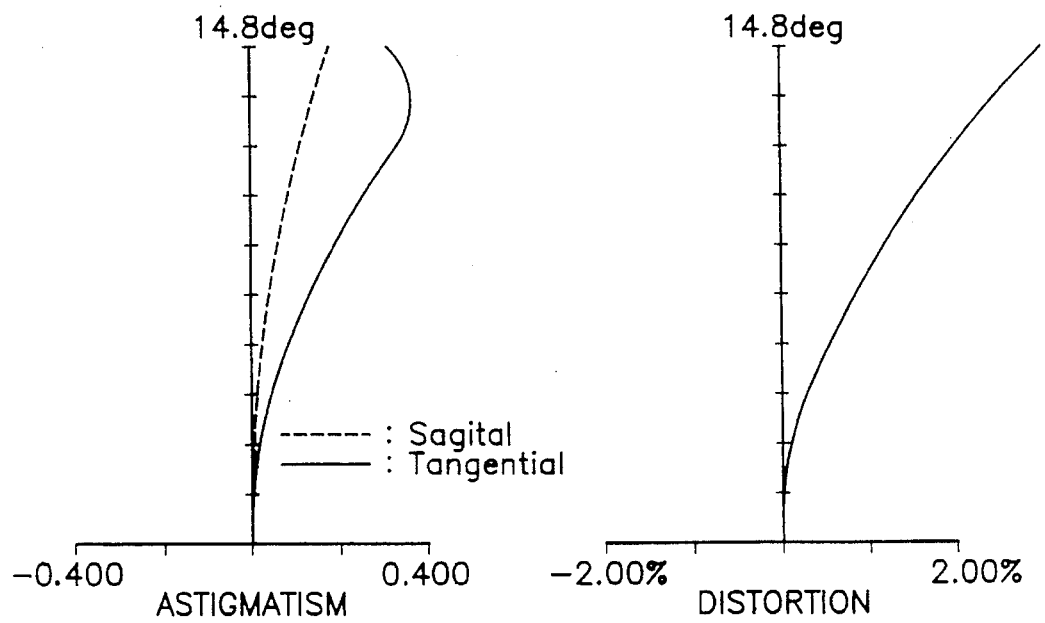

FIG.6C
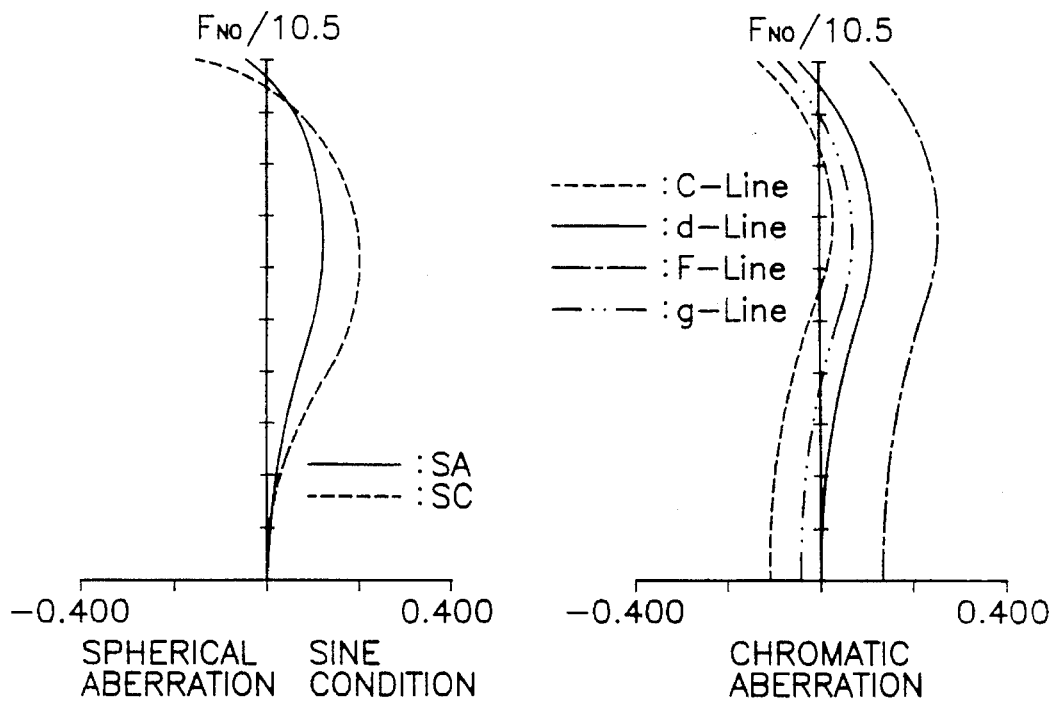
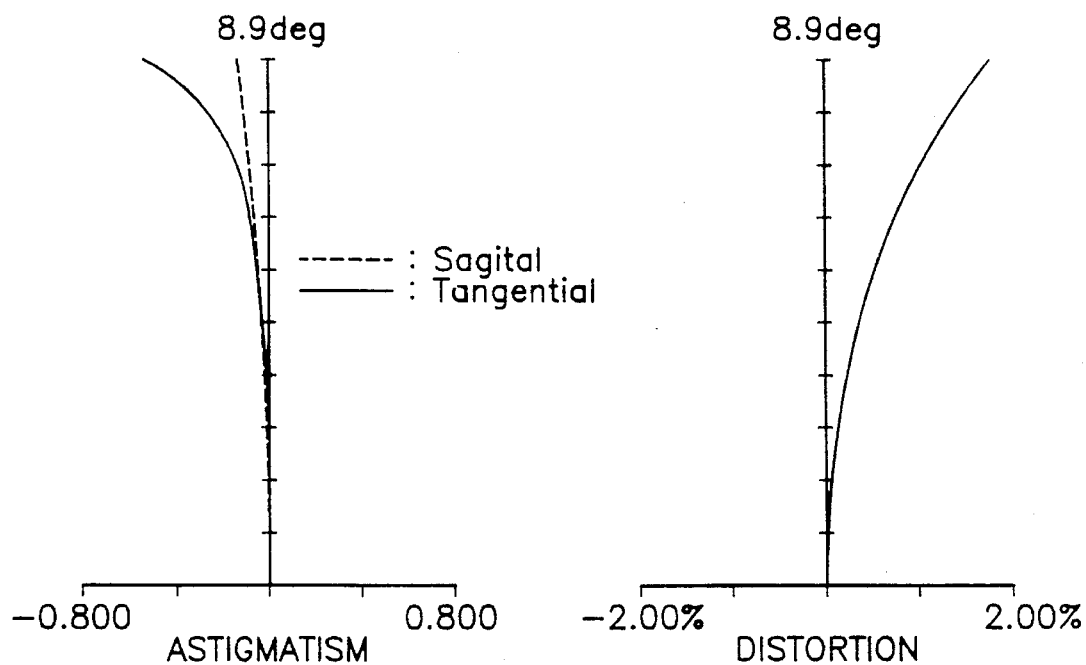

ZOOM LENS

BACKGROUND OF THE INVENTION

A. Field of the Invention

The present invention relates to a compact zoom lens system having a high zoom ratio.

B. Description of the Prior Art

Recently, so called "compact" cameras tend to have zoom features in addition to having automatic features and being compact. Historically, zoom lenses have been widely used for single lens reflex cameras, and various types of zoom lenses for such applications have been proposed. However, zoom lenses designed for single-lens reflex cameras are not suitable for compact camera applications because such zoom lenses have a long back focus distance and are not sufficiently compact.

For compact cameras, two types of zoom lenses have been proposed. The first type is composed of two lens groups and typically has an approximately 1.5 times zoom ratio. However, for a zoom ratio greater than 2.0, this first type can not practically be made compact.

The second type is composed of three lens groups and typically has an approximately 2.5 times zoom ratio. U.S. Pat. Nos. 4,978,204; 5,002,373; and 5,033,832 have proposed the second type. However, the zoom ratio of this second type is limited to an approximately 2.6 times, and this zoom ratio is not sufficient for compact camera applications.

For example, U.S. Pat. Nos. 4,978,204 and 5,002,373 proposed zoom lenses of the second type having an approximately 2.6 times zoom ratio and composed of eleven elements. U.S. Pat. No. 5,033,832 proposed zoom lenses of the second type having an approximately 2.7 times zoom ratio and composed of twelve (12) elements. The zoom lenses proposed in the '832 patent widen the viewing angle at an wide angle position, but its 2.7 times zoom ratio is still insufficient. For compact cameras, the zoom ratio of at least 3.5 times is desired.

SUMMARY OF THE INVENTION

The present invention overcomes the problems and disadvantages of the prior art by providing a zoom lens system of three lens groups which is compact and has sufficiently high magnification, i.e., approximately 3.5 times zoom ratio, while delivering a good optical performance.

To achieve the objects and in accordance with the purpose of the invention, as embodied and broadly described herein, the zoom lens system of the present invention comprises a first lens group having a positive refractive power, a second lens group having a positive refractive power and spaced from the first lens group at a first distance, and a third lens group having a negative refractive power and spaced from the second lens group at a second distance, the first and second distances being variable during zooming, wherein $3.0 < f_T/f_W$;

and $L_T/f_T < 1.0$ where $f_T$: focal length of the zoom lens system at a telephoto position, $f_W$: focal length of the zoom lens system at a wide angle position, $L_T$: distance from the first surface of the zoom lens system to the image plane at a telephoto position.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

The accompanying drawings, which are incorporated in and constitute a part of this specification, illustrate one embodiment of the invention and together with the description, serve to explain the principles of the invention.

BRIEF DESCRIPTION OF THE DRAWINGS

FIGS. 1A to 1C are sectional views of a zoom lens at (a) wide angle, (b) middle and (c) telephoto positions according to a first preferred embodiment of the present invention.

FIGS. 2A to 2C show the extent of various aberrations associated with the zoom lens at (a) wide angle, (b) middle and (c) telephoto positions, according to the first preferred embodiment of the present invention.

FIGS. 3A to 3C are sectional views of a zoom lens at (a) wide angle, (b) middle and (c) telephoto positions according to a second preferred embodiment of the present invention.

FIGS. 4A to 4C show the extent of various aberrations associated with the zoom lens at (a) wide angle, (b) middle and (c) telephoto positions, according to the second preferred embodiment of the present invention.

FIGS. 5A to 5C are sectional views of a zoom lens at (a) wide angle, (b) middle and (c) telephoto positions according to a third preferred embodiment of the present invention.

FIGS. 6A to 6C show the extent of various aberrations associated with the zoom lens at (a) wide angle, (b) middle and (c) telephoto positions, according to the third preferred embodiment of the present invention.

DESCRIPTION OF THE PREFERRED EMBODIMENT

Figure 1B:
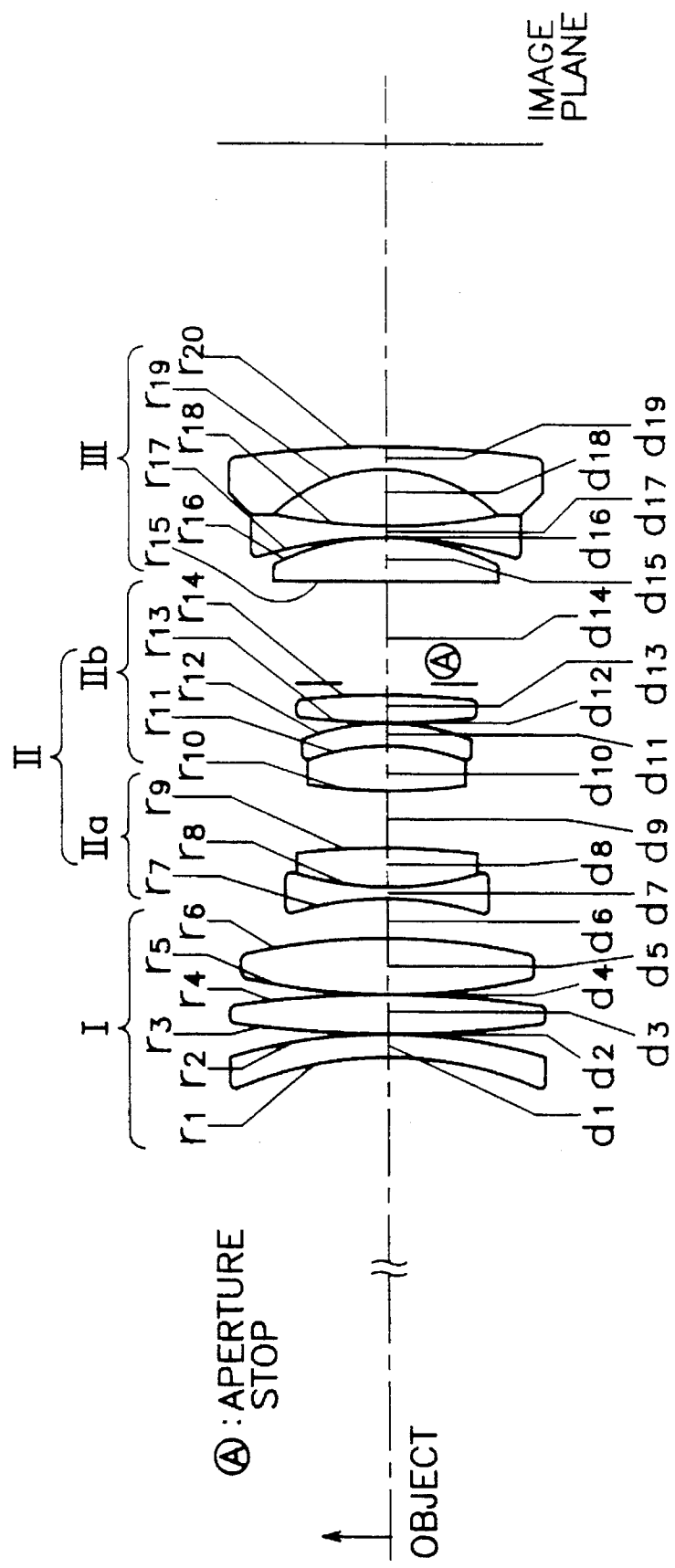

Reference will now be made in detail to first, second and third preferred embodiments of the present invention, examples of which are illustrated in the accompanying drawings in reference to FIGS. 1, 3, and 5, respectively. Wherever possible, the same reference numbers will be used throughout the drawings to refer to the same or like parts.

To facilitate the understanding of the structure and operation of the zoom lens system of the present invention, as embodied herein, the description of the zoom lens system according to the above three embodiments of the present invention is first collectively made in reference to paragraphs I through IX.

I. Referring to FIGS. 1, 3, and 5, the zoom lens system, as embodied herein, includes a first lens group I, a second lens group II, and a third lens group III spaced from one another and arranged in sequence, in the respective order from the object. Second lens group II includes a first lens subgroup IIa and a second lens subgroup IIb spaced from one another at a given distance, and arranged in sequence in the respective order form the object side. First and second lens groups I and II, as embodied herein, preferably have a positive refractive power and third lens group III has a negative refractive power.

In the zoom lens system, as embodied herein, preferably the distance between first and second lens groups I and II, and the distance between second and third lens groups II and III are varied during zooming. To obtain the desired high zoom ratio, the zoom lens system, as embodied herein, preferably satisfies a relation:

$$3.0 < f_T/f_W \quad (1)$$

where $f_T$ is the focal length of the zoom lens system at a telephoto position and $f_W$ is the focal length of the zoom lens system at a wide angle position.

II. To obtain compactness, the zoom lens system, as embodied herein, preferably satisfies relations:

$$L_T/f_T < 1.0 \quad (2)$$

$$3.5 < mIII_T < 5.5 \quad (3)$$

where $L_T$ is the distance from the first surface of the zoom lens system to the image plane at a telephoto position, and $mIII_T$ is a lateral magnification ratio of third lens group III at a telephoto position. The first surface refers to the surface of the zoom lens facing the object and the image plane refers to the camera film or the focusing side opposite the object.

III. The zoom lens system, as embodied herein, preferably satisfies following relations:

$$0.18 < fI,II_T/f_T < 0.28 \quad (4)$$

$$-0.20 < fIII/f_T < -0.10 \quad (5)$$

where $fI,II_T$ is a combined focal length of first and second lens groups I and II at a telephoto position, and $fIII$ is the focal length of third lens group III of the zoom lens system.

IV. First lens group I of the zoom lens system, as embodied herein, preferably includes at least one element of negative lens and positive lens, and satisfies relations:

$$-1.0 < fI_N/f_T < -0.5 \quad (6)$$

$$40 < \upsilon I_P - \upsilon I_N \quad (7)$$

where $fI_N$ is the focal length of the negative lens of first lens group I; $\upsilon I_P$ is an average of the ABBE number of the positive lens of first lens group I; and $\upsilon I_N$ is an average of the ABBE number of the negative lens of first lens group I. Hereinafter, the negative lens refers to a lens having a negative refractive power and positive lens a lens having a positive refractive power.

V. In second lens group II of the zoom lens system, as embodied herein, first lens subgroup IIa preferably includes at least one element of negative lens and positive lens. Second lens subgroup IIb preferably includes at least one element of negative lens and positive lens. Second lens group II preferably satisfies relations:

$$40 < \upsilon IIb_P - \upsilon IIb_N \quad (8)$$

where $\upsilon IIb_P$ is an average of the ABBE number of the positive lens of second subgroup IIb and $\upsilon IIb_N$ is an average of the ABBE number of the negative lens of second subgroup IIb of second lens group II.

VI. Third lens group III of the zoom lens system, as embodied herein, preferably includes two elements of negative lens and one element of positive lens, and satisfies $$0.15 < fIII_P/f_T < 0.28 \quad (9)$$

where $fIII_P$ is the focal length of the positive lens of third lens group III.

VII. The zoom lens system, as embodied herein, preferably satisfies relations:

$$\Delta D_{I,II}/f_T = -\Delta D_{II,III}/f_T \quad (10)$$

$$|\Delta D_{I,II}/f_T| < 0.10 \quad (11)$$

Where $D_{I,II}$ is the change in the distance between first and second lens groups I and II when the position of the zoom lens system changes from a telephoto position to a wide angle position; and $D_{II,III}$ is the change in the distance between second and third lens groups II and III when the position of the zoom lens system changes from the telephoto position to the wide angle position.

VIII. The zoom lens system, as embodied herein, preferably satisfies relations:

$$f/f_T < 0.55 \quad (12)$$

$$|fII,III_W/fII,III_T| \geq 3.3; \ fII,III_T < 0 \quad (13)$$

where fI: focal length of first lens group I $fII,III_W$: combined focal length of first and second lens groups II and III at a wide angle position $fII,III_T$: combined focal length of first and second lens groups II and III at a telephoto position IX. The surface of each lens in the zoom lens system of the present invention, as embodied herein, is preferably spherical.

The operation of the zoom lens system of the present invention, as embodied in the first, second and third embodiments, is described collectively in reference to paragraphs I through IX above.

Paragraph I sets forth a basic condition for the construction of the zoom lens system and more particularly the disposition of the refractive power among the lens groups within the zoom lens system, to obtain one of the primary features of the present invention, i.e., a large zoom ratio.

Paragraph II relates to obtaining another feature of the present invention, i.e., compactness. The zoom lens system of the present invention, as embodied herein, includes three lens groups I, II, and III in which the total length of the zoom lens system is normally maximized when the system is at a telephoto position. However, to obtain a large zoom ratio while simultaneously being compact, the total length of the zoom lens system, as embodied herein, is preferably made smaller than the focal length of the zoom lens system at a telephoto position, by satisfying the condition set forth in relation (3).

It is well established that $$f = f_I \cdot m_{II} \cdot m_{III}$$

Where f: the focal length of the zoom lens system $f_I$: focal length of first lens group I of the zoom lens system $m_{II}$: lateral magnification ratio of second lens group II $m_{III}$: lateral magnification ratio of third lens group III.

Accordingly, to enlarge focal length f of the zoom lens system at a telephoto position, all or any of the above three elements $f_I$, $m_{II}$, and $m_{III}$ should be enlarged.

However, the enlargement of $f_I$ is not desired because it decreases the refractive power of first lens group I, and makes it difficult to make the zoom lens system compact. Further, although the enlargement of $m_{II}$ helps make the zoom lens system compact, it makes it difficult to compensate for aberrations associated with third lens group III because first and second lens groups I and II have a strong positive refractive power.

Therefore, according to the embodiments of the present invention, to make the zoom lens system compact, focal length f of the zoom lens system is enlarged by setting $m_{III}$, i.e., lateral magnification ratio of third lens group III, at a telephoto position to a value which falls within the range set forth in relation (3). If the value of $m_{III}$ falls below the lower limit of the range set forth in relation (3), a large zoom ratio cannot be obtained. On the other hand, if it exceeds the upper limit, the refractive power of third lens group III becomes excessive, thus making it difficult to compensate for aberrations and creating a problem during lens assembly because it excessively increases lens sensitivity.

Paragraph III relates to obtaining a large zoom ratio and compactness in greater details. Relation (4) represents a combined refractive power of first and second lens groups I and II of the zoom lens system at a telephoto position, and if the combined power falls below the lower limit of the range set forth in relation (4), the refractive power of first lens group I and second lens group II become excessive, thus making it difficult to compensate for aberrations the negative power of third lens group III. On the other hand, if it exceeds the upper limit, although it may help compensate for aberrations in third lens group III, it would make it difficult to make the system compact.

Relation (5) sets forth a range of refractive power of third lens group III. The distance between second and third lens groups II and III is determined by the condition set forth in relation (4) as well as relation (5). In the condition set forth in relation (5), if the focal length of third lens group III falls below the lower limit of the range set forth therein, it increases the distance between second and third lens groups II and III, making it difficult to make the zoom lens system compact. If the focal length exceeds the upper limit, it degrades the performance because it increases aberrations.

Paragraph IV sets forth the condition for compensating for generic aberrations and chromatic aberrations for first lens group I of the zoom lens system. More specifically, to minimize variations in chromatic aberrations in the zoom lens which occur during zooming and obtain high performance, chromatic aberrations associated with each lens group of the zoom lens system are eliminated by satisfying the above condition.

Although aberrations in first lens group I are compensated for by having at least one element of negative lens and positive lens in first lens group I, if the referenced value in relation (6) exceeds the upper limit or falls below the lower limit of the range set forth in relation (6), the compensation for spherical and COMA aberrations become difficult. Relation (7) sets forth a condition necessary to eliminate chromatic aberrations associated with first lens group I. According to the embodiments of the present invention, to compensate for aberrations and eliminate chromatic aberrations, the refractive power of the positive and negative lens in first lens group is set to a small value, and a material having a large ABBE number is used in the positive lens of first lens group I, as set forth in relation (7).

Further, if first lens group I has at least one element of positive refractive lens using a material with an ABBE number of greater than seventy five (75), it is possible to use a material having a high refractive power in the negative lens, yet satisfying relation (7) and compensating for chromatic and other aberrations with a small lens construction.

Paragraph V relates to the construction of the lens of second lens group II. As described above, second lens group II of the zoom lens system, as embodied herein, includes first subgroup IIa having a negative refractive power and second subgroup IIb having a positive refractive power. Although each lens group eliminates chromatic aberrations and compensates for aberrations by having positive and negative lens therein, the elimination of chromatic aberrations is more prominently obtained by second subgroup IIb having a strong positive refractive power, satisfying the condition set forth in relation (8).

Further, in second lens group II, if at least one element of positive lens of second lens subgroup IIb uses a material with a ABBE member of greater than 75, it is possible to use a material having a high refractive power in the negative lens while satisfying relation (8), and yet compensate for chromatic and other aberrations with a small lens construction.

Paragraph VI relates to the construction of the lens of third lens group III of the zoom lens system. Although third lens group III as a whole has a strong negative refractive power, the negative lens alone can not eliminate chromatic aberrations or compensates for Petzval's sums of the image plane.

Accordingly, third lens group III includes an element of positive lens in addition to two elements of negative lens. Further, to eliminate chromatic aberrations and compensate for Petzval's sums of the refractive power of the positive lens of third lens group III is set to a value which falls within the range set forth in relation (9). If the referenced value in relation (9) exceeds the upper limit or falls below the lower limit of the range set forth in relation (9), the refractive power of the negative lens becomes too large or too small, making it difficult to compensate for aberrations.

Paragraph VII relates to the movements of each lens group in the zoom lens system during zooming. In the zoom lens system, as embodied herein, although it is fundamental to move each of the first, second and third lens groups individually during zooming, even more compact and less expensive zoom lens systems are obtained by satisfying relations (10) and (11).

For example, relation (10) relates to moving the first and third lens groups collectively during zooming, and this helps make the barrel construction of the lens simpler and less expensive. If relation (10) is not satisfied, the barrel construction or the zoom lens system has to be such that the first through third lens groups in the zoom lens system are moved individually, and this would cause the number of elements in the zoom lens system and the cost of assembly increase, thus increasing the cost of the system.

Relation (11) relates to making the system more compact by restricting the extent of the change in the distance between the lens groups during zooming. When the zoom ratio is greater than three (3), although in general the extent of the change in the distance between the lens groups during zooming from a wide angle position to a telephoto position can easily amount to approximately 0.15, in accordance with the embodiment of the present invention, the extent of the change is preferably restricted to the range set forth in relation (11) to obtain compactness in the zoom lens systems.

Referring to paragraph VIII, in the zoom lens system, as embodied herein, the focal length of first lens group I of a positive refractive power is preferably restricted to a value which falls within the range set forth in relation (12), to make the system compact. Further, the combined focal length of second lens group II of a positive refractive power and third lens group III of a negative refractive power is preferably restricted to a value which falls within the range set forth in relation (13), to reduce the total length of the system at a telephoto position.

Relation (13) sets the combined refractive power of second and third groups II and III at a wide angle position to a small value. In other words, at a telephoto position, second and third lens groups II and III having a combined large negative power are disposed behind first lens group I having a strong positive power which satisfies relation (12), viewing from the object. Such disposition of the lens groups helps obtain compactness. In other words, if the referenced value falls outside the range set forth in relations (12) and (13), it is difficult to obtain both compactness and a large zoom ratio simultaneously.

Paragraph IX relates to constructing the above described zoom lens having a high zoom ratio with a low cost spherical lens. Although a progress has been made in technique of making aspheric surface lenses, such aspheric surface lenses are still too expensive. Therefore, for low cost systems, it is advantageous to use spherical lenses instead. Employing the principles and concepts described above, with present invention, it is possible to obtain a compact zoom lens having a high zoom ratio and performance, but yet using low cost spherical lens.

Figure 2A:
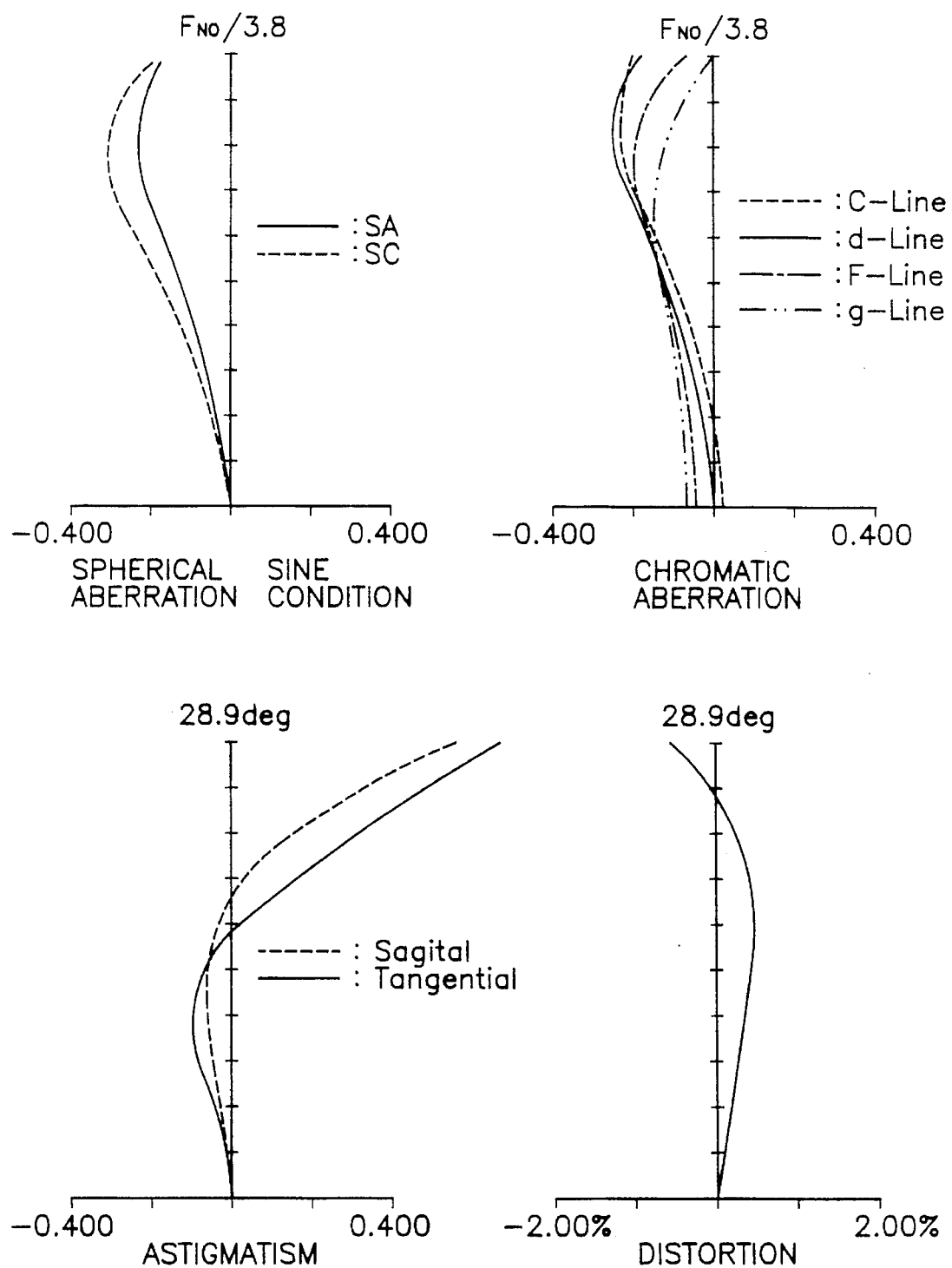

More specifically, the zoom lens system in accordance with each of the first, second and third embodiments of the present invention is discussed individually below. FIG. 1 refers to the zoom lens system according to the first embodiment of the present invention, FIG. 2 shows the extent of various aberrations associated with the zoom lens system according to the first embodiment at various zoom lens system positions, and should be self explanatory. Referring to FIG. 1, the zoom lens system, as embodied herein, preferably includes an aperture stop "A" between second and third lens groups II and III and adjacent second lens subgroup IIb of second lens group II.

In general, aperture stop A is preferably disposed in the middle location of the zoom lens system, i.e., in the middle of second lens group II. However, such disposition of aperture stop A necessitates the split of second lens group II into two (2) parts, making the assembly more complicated and amenable to errors and thus making it difficult to obtain a high performance system. Therefore, to overcome these problems in functions and assembly, and to obtain a low cost system, the zoom lens system, as embodied herein, preferably includes aperture stop A between second and third lens groups II and III, and avoids the splitting of second lens group II. A set of exemplary parameter values for the zoom lens system of, embodied herein, is provided in reference to Table 1.

TABLE 1

|  | wide angle | median angle | telephoto angle |
|---|---|---|---|
| f | 39.5 | 80.0 | 136.9 |
| $F_{no}$ | 1:3.8 | 1:6.7 | 1:10.5 |
| ω | 28.9° | 14.8° | 8.9° |
| (ω = half view angle) | | | |

| Curvature radius | Thickness or distance | Refractive index | Dispersion coefficient |
|---|---|---|---|
| r1 −36.452 | | | |
| r2 −65.659 | d1 1.500 | n1 1.84666 | v1 23.83 |
| r3 94.014 | d2 0.150 | | |
| r4 37078.444 | d3 2.400 | n2 1.49700 | v2 81.61 |
| r5 47.876 | d4 0.150 | | |
| r6 −51.426 | d5 3.900 | n3 1.49700 | v3 81.61 |

TABLE 1-continued

| r7 −25.378 | d6 *1 | | |
|---|---|---|---|
| r8 15.454 | d7 1.000 | n4 1.77250 | v4 49.62 |
| r9 −61.544 | d8 3.860 | n5 1.72825 | v5 28.32 |
| r10 85.933 | d9 7.890 | | |
| r11 −11.816 | d10 4.250 | n6 1.48749 | v6 70.44 |
| r12 −21.172 | d11 1.200 | n7 1.84666 | v7 23.83 |
| r13 74.806 | d12 0.150 | | |
| r14 −26.927 | d13 2.650 | n8 1.49700 | v8 81.61 |
| r15 −174.349 | d14 *2 | | |
| r16 −20.267 | d15 3.290 | n9 1.80518 | v9 25.46 |
| r17 −28.027 | d16 0.150 | | |
| r18 74.906 | d17 1.200 | n10 1.77250 | v10 49.62 |
| r19 −13.028 | d18 4.310 | | |
| r20 −84.078 | d19 1.500 | n11 1.77250 | v11 49.62 |
| | d20 *3 | | |

|  | wide angle | median angle | telephoto angle |
|---|---|---|---|
| *1 d6 | 3.020 | 10.069 | 13.470 |
| *2 d14 | 13.824 | 6.775 | 3.374 |
| *3 d20 | 8.492 | 32.25 | 64.928 | d20 refers to back focus distance $f_b$, i.e., the distance between the image plane and the surface facing the image plane of third lens group III.

The values of the conditions set forth in the above relations (1)~(13) are as follows:

(1) $f_T/f_W$: 3.466

(2) $L_T/f_T$: 0.886

(3) $mIII_T$: 4.474

(4) $fI,II_T/f_T$: 0.224

(5) $fIII/f_T$: −0.139

(6) $fI_N/f_T$: −0.724

(7) $vI_P - vI_N$: 57.78

(8) $vIIb_P - vIIb_N$: 52.2

(9) $fIII_P/f_T$: 0.206

(10) $\Delta D_{I,II}/f_T = -\Delta D_{II,III}/f_T$: 0.076

(11) $|\Delta D_{I,II}/f_T|$: 0.076

(12) $f_1/f_T$: 0.464

(13) $|fI,III_W/fII,III_T|$: 39.7

Figure 3B:
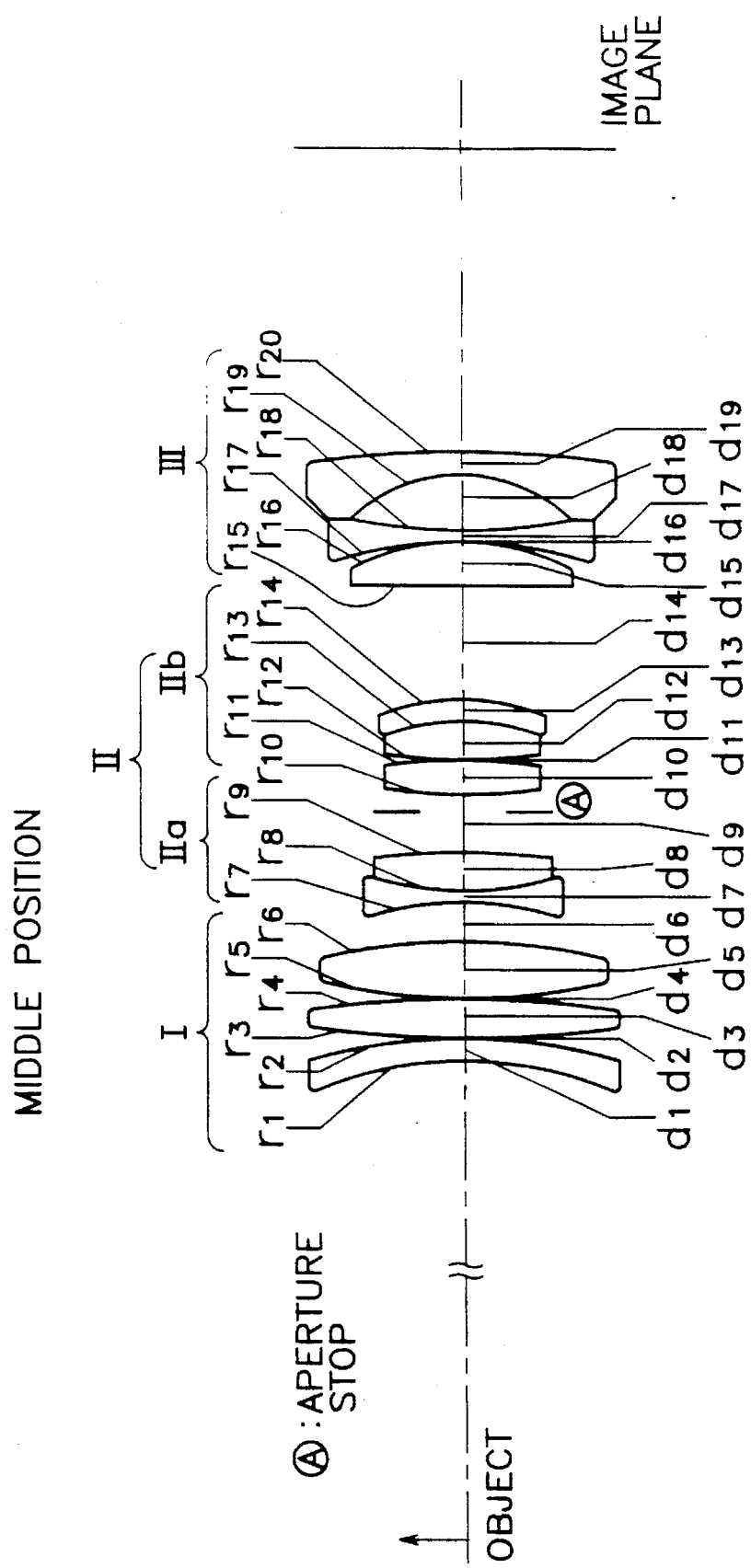

FIG. 3 refers to the zoom lens system according to the second embodiment of the present invention. FIG. 4 shows the extent of various aberrations associated with the zoom lens system according to the second embodiment at various zoom lens system positions, which figure should be self explanatory. Referring to FIG. 3, the zoom lens system, as embodied herein, preferably includes aperture stop A between first and second lens subgroups IIa and IIb of second group II.

TABLE 2

|  | wide angle | median angle | telephoto angle |
|---|---|---|---|
| f | 39.5 | 80.0 | 130.0 |
| $F_{no}$ | 1:3.9 | 1:6.7 | 1:10.0 |
| ω | 28.2° | 14.6° | 9.2° |

| Curvature radius | Thickness or distance | Refractive index | Dispersion coefficient |
|---|---|---|---|
| r1 −45.472 | | | |
| r2 −105.785 | d1 1.500 | n1 1.84666 | v1 23.83 |
| r3 85.583 | d2 0.150 | | |
| r4 −133.005 | d3 2.600 | n2 1.49700 | v2 81.61 |
| r5 41.913 | d4 0.150 | | |
| r6 −64.302 | d5 3.700 | n3 1.49700 | v3 81.61 |
| r7 −25.216 | d6 *1 | | |

TABLE 2-continued

| | | | |
|---|---|---|---|
| r8 14.911 | d7 1.000 | n4 1.77250 | v4 49.62 |
| r9 −74.331 | d8 3.000 | n5 1.69895 | v5 30.05 |
| r10 40.637 | d9 9.710 | | |
| r11 −29.525 | d10 2.650 | n6 1.48749 | v6 70.44 |
| r12 83.270 | d11 0.150 | n7 1.48749 | v7 70.44 |
| r13 −11.927 | d12 4.250 | | |
| r14 −19.730 | d13 1.200 | n8 1.84666 | v8 23.83 |
| r15 −47.721 | d14 *2 | | |
| r16 −18.417 | d15 3.110 | n9 1.80518 | v9 25.46 |
| r17 −25.781 | d16 0.150 | | |
| r18 69.200 | d17 1.200 | n10 1.64000 | v10 60.15 |
| r19 −12.485 | d18 4.950 | | |
| r20 −71.822 | d19 1.500 | n11 1.77250 | v11 49.62 |
| | d20 *3 | | |

| | wide angle | median angle | telephoto angle |
|---|---|---|---|
| *1 d6 | 3.067 | 9.090 | 11.836 |
| *2 d14 | 9.769 | 3.746 | 1.000 |
| *3 d20 | 8.5 | 30.54 | 56.995 |

The values of the conditions set forth in the above relations (1)–(13) are as follows:

(1) $f_T/f_W$: 3.291

(2) $L_T/f_T$: 0.852

(3) $mIII_T$: 4.55

(4) $fI,II_T/f_T$: −0.220

(5) $fIII/f_T$: 0.128

(6) $fI_N/f_T$: 0.733

(7) $vI_P - vI_N$: 57.78

(8) $vIIb_P - vIIb_N$: 41.61

(9) $fIII_P/f_T$: 0.274

(10) $\Delta D_{I,II}/f_T = -\Delta D_{II,III}/f_T$: 0.067

(11) $|\Delta D_{I,II}/f_T|$: 0.067

(12) $f_s/f_T$: 0.403

(13) $fII,III_W/fII,III_T$: 4.96

FIG. 5 refers to the zoom lens system according to the third embodiment of the present invention. FIG. 6 shows the extent of various aberrations associated with the zoom lens system according to the third embodiment at various zoom lens system positions, and should be self explanatory. The zoom lens system, as embodied herein, preferably includes aperture stop A between first and second lens subgroups IIa and IIb of second group II.

TABLE 3

| | wide angle | median angle | telephoto angle |
|---|---|---|---|
| f | 39.5 | 80.0 | 136.0 |
| $F_{no}$ | 1:4.0 | 1:6.9 | 1:10.8 |
| ω | 28.9° | 14.8° | 8.9° |

| Curvature radius | Thickness or distance | Refractive index | Dispersion coefficient |
|---|---|---|---|
| r1 −25.509 | | | |
| r2 −49.004 | d1 1.500 | n1 1.84666 | v1 23.83 |
| r3 −64.874 | d2 0.150 | | |
| r4 −24.980 | d3 3.600 | n2 1.49700 | v2 81.61 |
| r5 29.518 | d4 0.150 | | |
| r6 −116.064 | d5 3.700 | n3 1.49700 | v3 81.61 |
| r7 −29.790 | d6 *1 | | |
| r8 12.022 | d7 1.000 | n4 1.77250 | v4 49.62 |
| r9 −176.144 | d8 3.000 | n5 1.74077 | v5 27.76 |
| r10 47.826 | d9 9.750 | | |
| r11 −80.926 | d10 2.650 | n6 1.49700 | v6 81.61 |
| r12 44.171 | d11 0.150 | n7 1.51728 | v7 69.68 |
| r13 −10.227 | d12 4.250 | | |

TABLE 3-continued

| | | | |
|---|---|---|---|
| r14 −16.557 | d13 1.200 | n8 1.84666 | v8 23.83 |
| r15 −44.973 | d14 *2 | | |
| r16 −16.780 | d15 3.210 | n9 1.80518 | v9 25.46 |
| r17 −23.230 | d16 0.150 | | |
| r18 93.346 | d17 1.200 | n10 1.77250 | v10 49.62 |
| r19 −11.412 | d18 4.900 | | |
| r20 −43.980 | d19 1.500 | n11 1.77250 | v11 49.62 |
| | d20 *3 | | |

| | wide angle | median angle | telephoto angle |
|---|---|---|---|
| *1 d6 | 3.808 | 9.423 | 12.203 |
| *2 d14 | 9.395 | 3.780 | 1.000 |
| *3 d20 | 8.502 | 30.074 | 59.006 |

The values of the conditions set forth in the above relations (1)–(13) are as follows:

(1) $f_T/f_W$: 3.433

(2) $L_T/f_T$: 0.840

(3) $mIII_T$: 4.94

(4) $fI,II_T/f_T$: 0.201

(5) $fIII/f_T$: 0.115

(6) $fI_N/f_T$: 0.476

(7) $vI_P - vI_N$: 57.78

(8) $vIIb_P - vIIb_N$: 51.82

(9) $fIII_P/f_T$: 0.233

(10) $\Delta D_{I,II}/f_T = -\Delta D_{II,III}/f_T$: 0.062

(11) $|\Delta D_{I,II}/f_T|$: 0.062

(12) $f_s/f_T$: 0.350

(13) $|fII,III_W/fII,III_T|$: 3.3

With the present invention, a compact zoom lens system having a high magnification ($f_T/f_W$) ratio of approximately 3.5 times and a telephoto ratio ($L_T/f_T$) of under 0.9 at a telephoto position is obtained. Further, the zoom lens system of the present invention uses low cost spherical lenses, instead of more expensive aspheric surface lenses, without degrading the optical performance of the system.

Other embodiments of the invention will be apparent to the skilled in the art from consideration of the specification and practice of the invention disclosed herein. It is intended that the specification and examples be considered as exemplary only, with a true scope and spirit of the invention being indicated by the following claims.

What is claimed is:

1. A zoom lens system, comprising:

a first lens group having a positive refractive power;

a second lens group having a positive refractive power and spaced from said first lens group at a first distance; and a third lens group having a negative refractive power and spaced from said second lens group at a second distance, said first and second distances being variable during zooming, wherein $3.0 < f_T/f_W$ $L_T/f_T < 1.0;$ and $0.18 < fI,II_T/f_T < 0.28$ where $f_T$: focal length of the zoom lens system at a telephoto position, $f_W$: focal length of the zoom lens system at a wide angle position, and $L_T$: distance from the first surface of the zoom lens system adjacent the object to the image plane opposite the object at a telephoto position, and $fI,II_T$: combined focal length of said first and second lens groups at a telephoto position.

2. The zoom lens system of claim 1, wherein $$0.20 < fIII/f_T < 0.11$$

where fIII: focal length of said third lens group.

3. The zoom lens system of claim 1, wherein said first lens group includes a negative lens with a negative refractive power and $$-1.0 < fI_N/f_T < -0.5$$

where $fI_N$: focal length of said negative lens of said first lens group.

4. The zoom lens systems of claim 1, wherein said first lens group includes one or more than one positive lens with a positive refractive power and one or more than one negative lens with a negative refractive power, and $$40 < \upsilon I_P - \upsilon I_N$$

where $\upsilon I_P$: average of the ABBE number of said positive lens of said first lens group, and $\upsilon I_N$: average of the ABBE number of the negative lens of said first lens group.

5. The zoom lens system of claim 1, wherein said first, second and third lens groups include a spherical lens.

6. The zoom lens system of claim 1, further comprising an aperture stop between said second and third lens groups.

7. The zoom lens system of claim 1, further comprising an aperture stop in said second lens group.

8. A zoom lens system, comprising:

a first lens group having a positive refractive power;

a second lens group having a positive refractive power and spaced from said first lens group at a first distance with no other lens group therebetween; and a third lens group having a negative refractive power and spaced from said second lens group at a second distance, said first and second distances being variable during zooming, wherein $$3.4 < f_T/f_W;$$

$$3.5 < mIII_T < 5.5;$$

$$0.15 < fIII_P/f_T < 0.28;$$

and $$L_T/f_T < 1.0$$

where $mIII_T$: lateral magnification ratio of said third lens group at a telephoto position, $L_T$: distance from the first surface of the zoom lens system to the image plane at a telephoto position, $f_T$: focal length of the zoom lens system at a telephoto position, $f_W$: focal length of the zoom lens system at a wide angle position, and $fIII_P$: focal length of said positive lens of said third lens group.

9. The zoom lens system of claim 8, wherein said second lens group of the zoom lens system includes first and second lens subgroups, wherein said first lens subgroup includes a negative lens with a negative refractive power and a positive lens with a positive refractive power, and said second lens subgroup includes said negative lens and positive lens, and wherein $$40 < \upsilon IIb_P - \upsilon IIb_N$$

where $\upsilon IIb_P$: average of the ABBE number of said positive lens of said second lens subgroup, and $\upsilon IIb_N$: average of the ABBE number of said negative lens of said second lens subgroup.

10. The zoom lens system of claim 8, further comprising an aperture stop between said second and third lens groups.

11. The zoom lens system of claim 8, further comprising an aperture stop in said second lens group.

12. The zoom lens system of claim 8, wherein $$\Delta D_{I,II}/f_T = -\Delta D_{II,III}/f_T$$

where $D_{I,II}$: change in said first distance during zooming, $D_{II,III}$: change in said second distance during zooming, and $f_T$: focal length of the zoom lens system at a telephoto position.

13. The zoom lens system of claim 9, further comprising an aperture stop between said first and second subgroups of said second lens group.

14. The zoom lens system of claim 11, wherein said aperture stop and the second lens group move together during zooming.

15. The zoom lens system of claim 12, wherein $$|\Delta D_{I,II}/f_T| < 0.10$$

where $\Delta D_{I,II}$: change in said first distance during zooming.

16. A zoom lens system, comprising:

a first lens group having a positive refractive power;

a second lens group having a positive refractive power and spaced from said first lens group at a first distance with no other lens group therebetween; and a third lens group having a negative refractive power and spaced from said second lens group at a second distance, said first and second distance being variable during zooming, wherein $$3.4 < f_T/f_W;$$

and $$L_T/f_T < 1.0$$

where $L_T$: distance from the first surface of the zoom lens system to the image plane at a telephoto position, $f_T$: focal length of the zoom lens system at a telephoto position, and $f_W$: focal length of the zoom lens system at a wide angle position, and wherein said first lens group includes at least one lens member of a negative lens and a positive lens, and at least the positive lens of said at least one lens member has a ABBE number equal to or greater than seventy five (75).

17. The zoom lens system of claim 16, wherein $$3.5 < mIII_T < 5.5$$

where $mIII_T$: lateral magnification ratio of said third lens group at a telephoto position.

18. A zoom lens system, comprising:

a first lens group having a positive refractive power;

a second lens group having a positive refractive power and spaced from said first lens group at a first distance with no other lens group therebetween; and a third lens group having a negative refractive power and spaced from said second lens group at a second distance, said first and second distances being variable during zooming, wherein $$3.4 < f_T/f_W$$

where $f_T$: focal length of the zoom lens system at a telephoto position, and $f_W$: focal length of the zoom lens at a wide angle position, and wherein said second lens group includes first and second lens subgroups, each subgroup having one or more than one positive lens with a positive refractive power and one or more than one negative lens with a negative refractive power, and the positive lens of said second subgroup has an ABBE number equal to or greater than seventy five (75).

19. The zoom lens system of claim 18, wherein $$L_T/f_T < 1.0$$

where $L_T$: distance from the first surface of the zoom lens system to the image plane at a telephoto position.

20. The zoom lens system of claim 18, wherein $$3.5 < mIII_T < 5.5$$

where $mIII_T$: lateral magnification ratio of said third lens group at a telephoto position.

21. A zoom lens system, comprising:

a first lens group having a positive refractive power;

a second lens group having a positive refractive power and spaced from said first lens group at a first distance with no other lens group therebetween; and a third lens group having a negative refractive power and spaced from said second lens group at a second distance, said first and second distances being variable during zooming, wherein $$3.0 < f_T/f_W;$$

$$\Delta D_{I,II}/f_T = -\Delta D_{II,III}/f_T;$$

and $$|\Delta D_{I,II}/f_T| < 0.10$$

where $f_T$: focal length of the zoom lens system at a telephoto position, $f_W$: focal length of the zoom lens system at a wide angle position, $D_{I,II}$: change in said first distance during zooming, and $D_{I,II}$: change in said second distance during zooming.

22. The zoom lens system of claim 21, wherein $$L_T/f_T < 1.0$$

where $L_T$: distance from the first surface of the zoom lens system to the image plane at a telephoto position.

23. The zoom lens system of claim 21, wherein $$3.5 < mIII_T < 5.5$$

where $mIII_T$: lateral magnification ratio of said third lens group at a telephoto position.

24. The zoom lens system of claim 21, wherein said first, second and third lens groups include a spherical lens.

25. A zoom lens system, comprising:

a first lens group having a positive refractive power;

a second lens group having a positive refractive power and spaced from said first lens group at a first distance with no other lens group therebetween; and a third lens group having a negative refractive power and spaced from said second lens group at a second distance, said first and second distances being variable during zooming, wherein $$3.4 < f_T/f_W;$$

$$L_T/f_T < 1.0;$$

and $$3.5 < mIII_T < 5.5$$

where $f_T$: focal length of the zoom lens system at a telephoto position, $f_W$: focal length of the zoom lens system at a wide angle position $L_T$: distance from the first surface of the zoom lens system to the image plane at a telephoto position, and $mIII_T$: lateral magnification ratio of said third lens group at a telephoto position.

26. The zoom lens system of claim 25, wherein said first, second and third lens groups include a spherical lens.

27. The zoom lens system of claim 25, wherein said third lens group include a positive lens with a positive refractive power, and $$0.15 < fIII_P/f_T < 0.28$$

where $fIII_P$: focal length of said positive lens of said third lens group.

28. A zoom lens system, comprising:

a first lens group having a positive refractive power;

a second lens group having a positive refractive power and spaced from said first lens group at a first distance; and a third lens group having a negative refractive power and spaced from said second lens group at a second distance, said first and second distances being variable during zooming, wherein $f_I/f_T < 0.55;$ $3.0 < f_T/f_W;$ $L_T/f_T < 1.0;$ $|fII,III_W/fII,III_T| \geq 3.3, fII,III_T < 0;$ and $0.18 < fI,II_T/f_T < 0.28$ where $f_I$: focal length of said first lens group, $f_T$: focal length of the zoom lens system at a telephoto position, $f_W$: focal length of the zoom lens system at a wide angle position, $L_T$: distance from the first surface of the zoom lens system to the image plane at a telephoto position, $fI,II_T$: combined focal length of said first and second lens groups at a telephoto position, $fII,III_W$: combined focal length of said second and third lens groups at a wide angle position, and $fII,III_T$: combined focal length of said second and third lens groups at a telephoto position.

29. The zoom lens system of claim 28, wherein said first and second and third lens groups include a spherical lens.

* * * * *